(12) United States Patent
Nakashima et al.

(10) Patent No.: US 9,533,604 B2
(45) Date of Patent: Jan. 3, 2017

(54) SEAT SLIDE DEVICE

(71) Applicants: AISIN SEIKI KABUSHIKI KAISHA, Kariya-shi (JP); Shirou Nakashima, Kariya-shi (JP); Manabu Handa, Kariya-shi (JP); Takahiro Sugama, Kariya-shi (JP)

(72) Inventors: Shirou Nakashima, Kariya (JP); Manabu Handa, Kariya (JP); Takahiro Sugama, Kariya (JP); Hideki Fujisawa, Hekinan (JP); Sho Kume, Kariya (JP); Tsutomu Oya, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 88 days.

(21) Appl. No.: 14/378,018

(22) PCT Filed: Feb. 6, 2013

(86) PCT No.: PCT/JP2013/052770
§ 371 (c)(1),
(2) Date: Aug. 11, 2014

(87) PCT Pub. No.: WO2013/121955
PCT Pub. Date: Aug. 22, 2013

(65) Prior Publication Data
US 2015/0001366 A1 Jan. 1, 2015

(30) Foreign Application Priority Data

Feb. 13, 2012 (JP) .................. 2012-028607
Nov. 28, 2012 (JP) .................. 2012-259681

(51) Int. Cl.
*B60N 2/08* (2006.01)
*B60N 2/07* (2006.01)
*B60N 2/015* (2006.01)

(52) U.S. Cl.
CPC ........... *B60N 2/0727* (2013.01); *B60N 2/0722* (2013.01); *B60N 2/08* (2013.01); *B60N 2/0818* (2013.01); *B60N 2/0843* (2013.01); *B60N 2/0155* (2013.01)

(58) Field of Classification Search
USPC ......... 248/424, 429; 296/65.01, 65.13, 65.11
See application file for complete search history.

(56) References Cited

U.S. PATENT DOCUMENTS

| 4,949,931 | A | 8/1990 | Fujiwara et al. |
| 6,616,233 | B1 * | 9/2003 | Debus ................ B60N 2/123 |
| | | | 248/429 |

(Continued)

FOREIGN PATENT DOCUMENTS

| CN | 1939768 A | 4/2007 |
| CN | 101716894 A | 6/2010 |

(Continued)

OTHER PUBLICATIONS

International Preliminary Report on Patentability issued Aug. 19, 2014 in PCT/JP2013/052770 filed Feb. 6, 2013.

(Continued)

*Primary Examiner* — Alfred J Wujciak
(74) *Attorney, Agent, or Firm* — Oblon, McClelland, Maier & Neustadt, L.L.P.

(57) ABSTRACT

A seat slide device is fixed to the floor of a vehicle and includes lower rails, each of which includes a front range and a rear range and extends forward and backward, and an upper rail supporting a movable seat and capable of moving over the lower rails. The seat slide device also includes a lock portion, a stopper, and a stopper-releasing operating portion. The lock portion selectively restricts movement of the upper rail on the lower rails at a plurality of positions. The lock portion is provided to the upper rail. The stopper stops movement of the upper rail before the upper rail (Continued)

advances from either one of the front range and the rear range, past this range, to the other range. The stopper-releasing operating portion enables movement of the upper rail when the upper rail has been stopped by the stopper.

11 Claims, 14 Drawing Sheets

(56) References Cited

U.S. PATENT DOCUMENTS

| | | | | |
|---|---|---|---|---|
| 7,195,303 | B2* | 3/2007 | Nihonmatsu | B60N 2/0825 248/429 |
| 2005/0285007 | A1 | 12/2005 | Tanaka | |
| 2007/0069098 | A1 | 3/2007 | Kojima | |
| 2008/0238127 | A1* | 10/2008 | Kojima | B60N 2/0705 296/65.13 |
| 2010/0090081 | A1 | 4/2010 | Kojima et al. | |
| 2011/0233368 | A1* | 9/2011 | Nihonmatsu | B60N 2/0705 248/429 |
| 2012/0018608 | A1* | 1/2012 | Nishide | B60N 2/067 248/429 |
| 2012/0032058 | A1 | 2/2012 | Nihonmatsu et al. | |
| 2013/0015312 | A1* | 1/2013 | Shiraki | B60N 2/0705 248/429 |

FOREIGN PATENT DOCUMENTS

| | | |
|---|---|---|
| CN | 102343838 A | 2/2012 |
| JP | 2 81738 | 3/1990 |
| JP | 2004 90791 | 3/2004 |
| JP | 2004 249928 | 9/2004 |
| JP | 2005-212518 | 8/2005 |
| JP | 2006 8028 | 1/2006 |
| JP | 2009-262670 | 11/2009 |

OTHER PUBLICATIONS

Written Opinion issued Mar. 5, 2013 in PCT/JP2013/052770 filed Feb. 6, 2013 (English translation only).

Combined Office Action and Search Report issued Oct. 10, 2015 in Chinese Patent application No. 201380008321.X (with English translation and English translation of Category of Cited Documents).

International Search Report Issued Mar. 5, 2013 in PCT/JP13/052770 Filed Feb. 6, 2013.

* cited by examiner

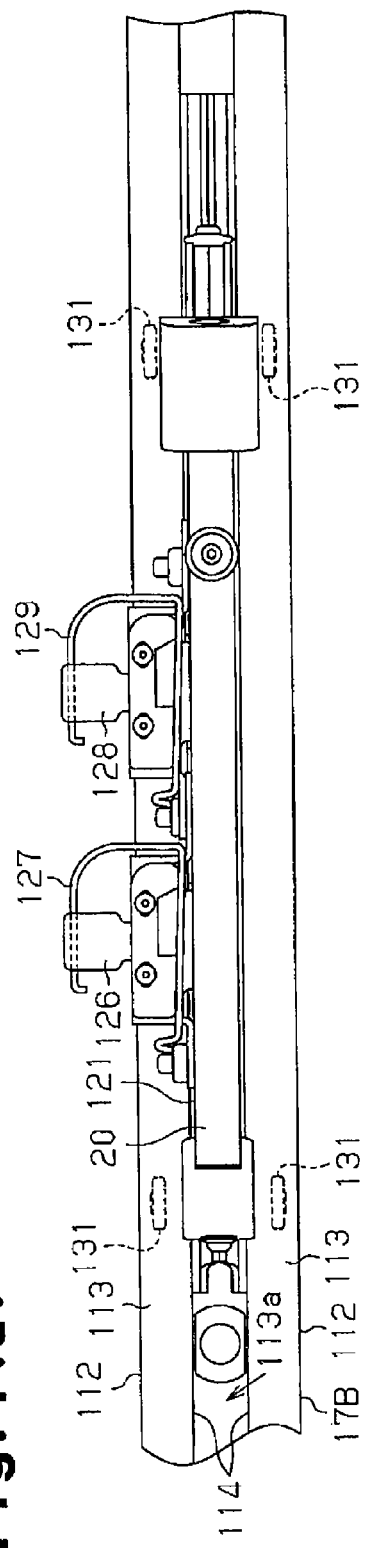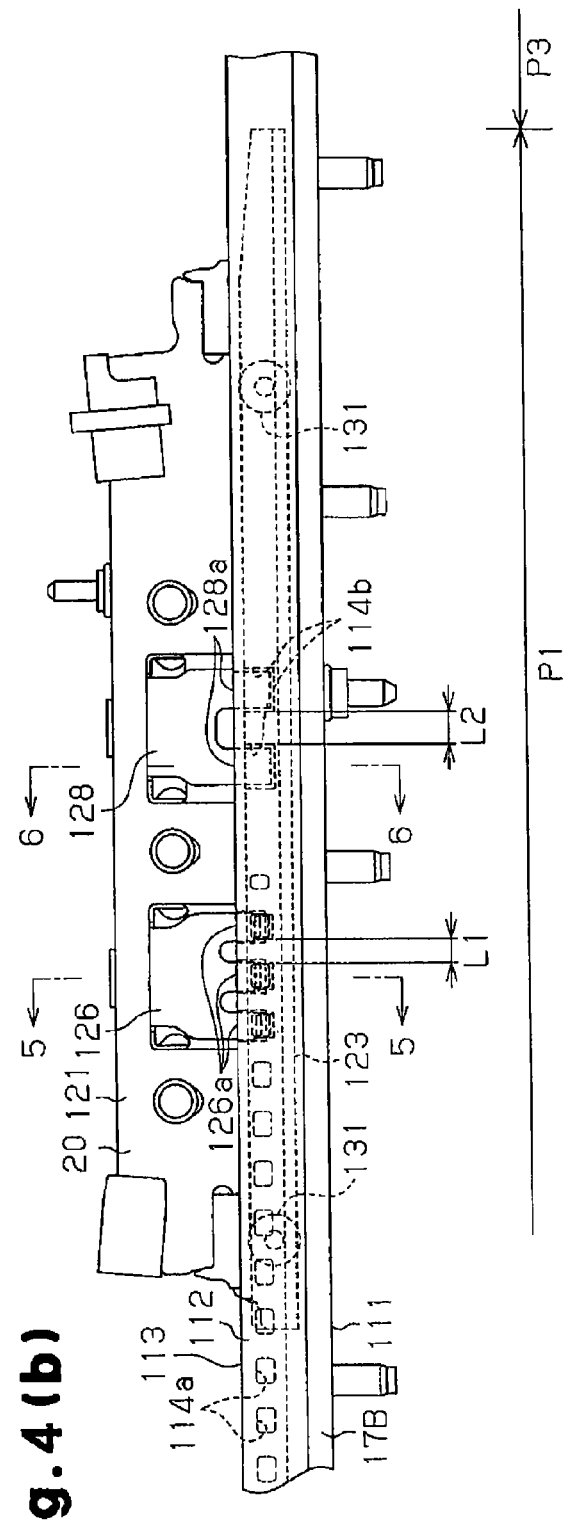
Fig.4(a)
Fig.4(b)

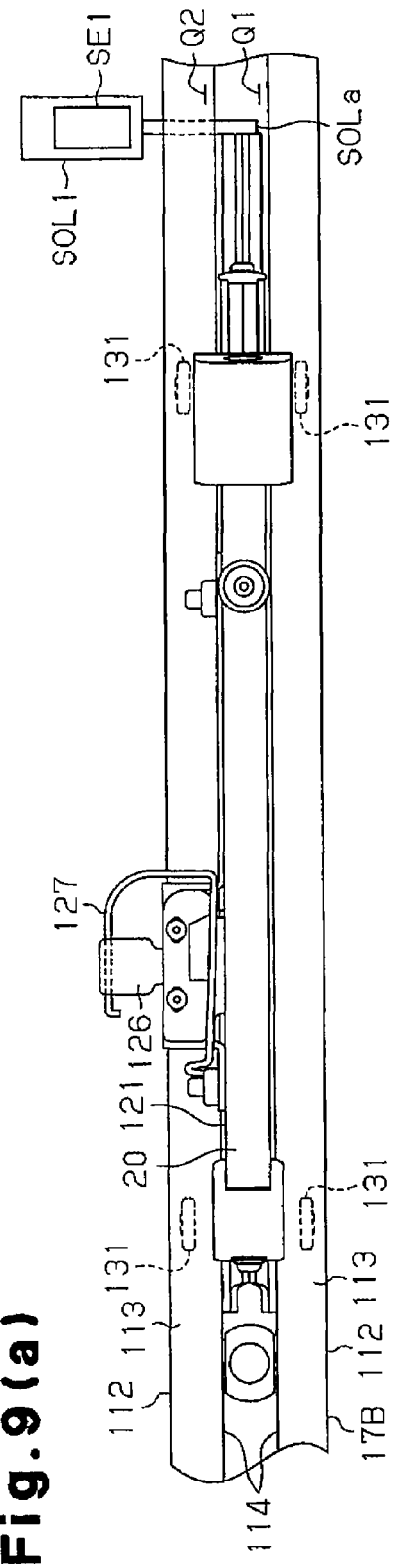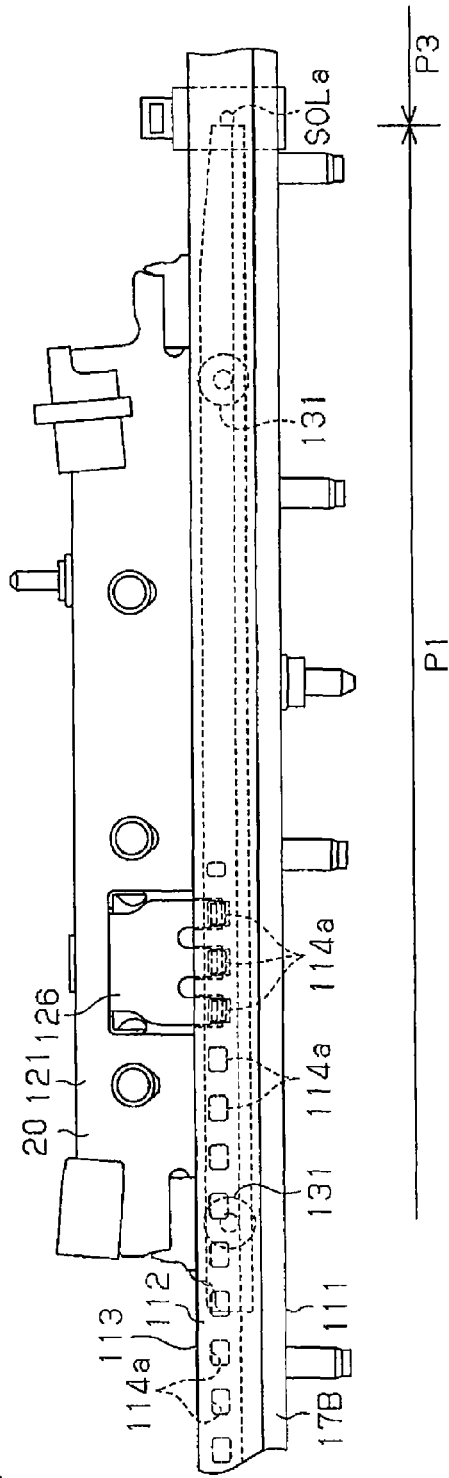

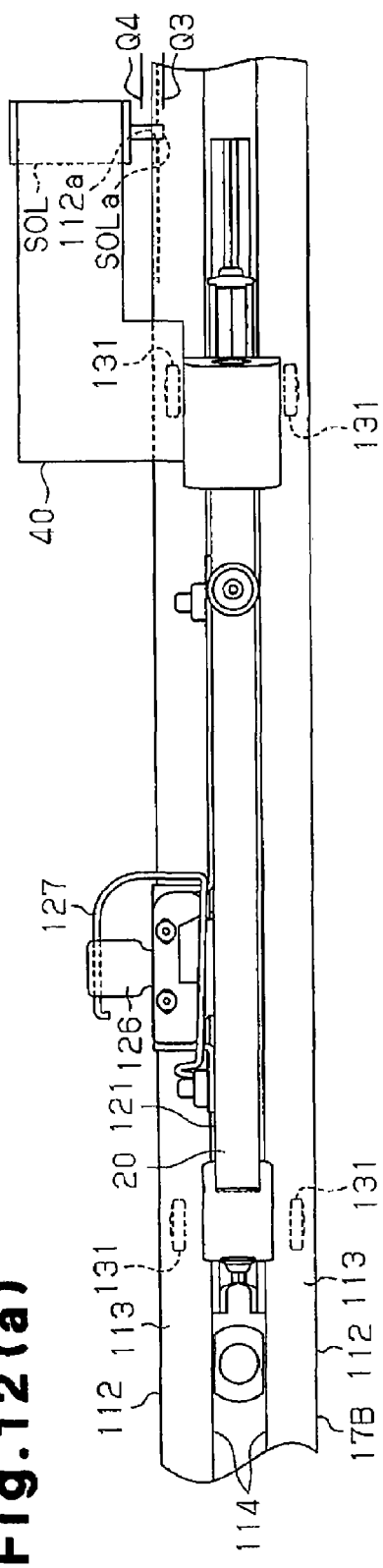
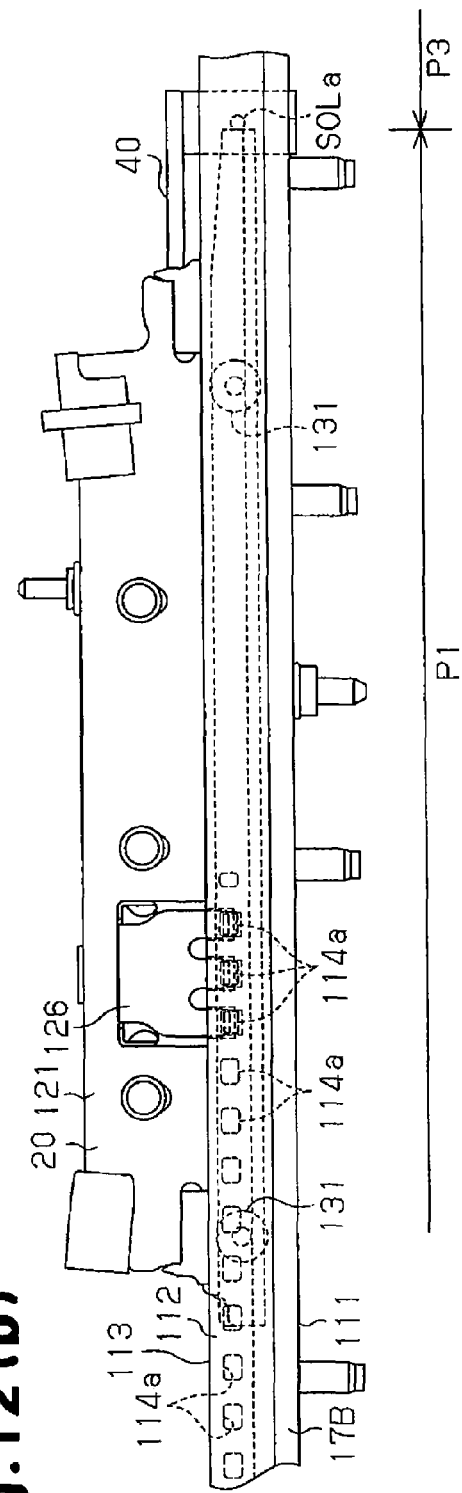
Fig. 12(a)
Fig. 12(b)

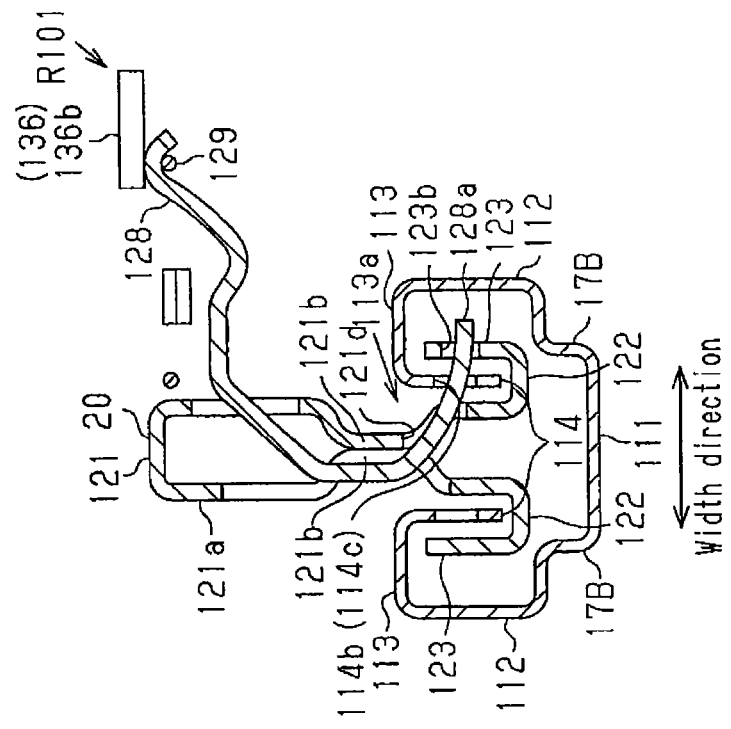
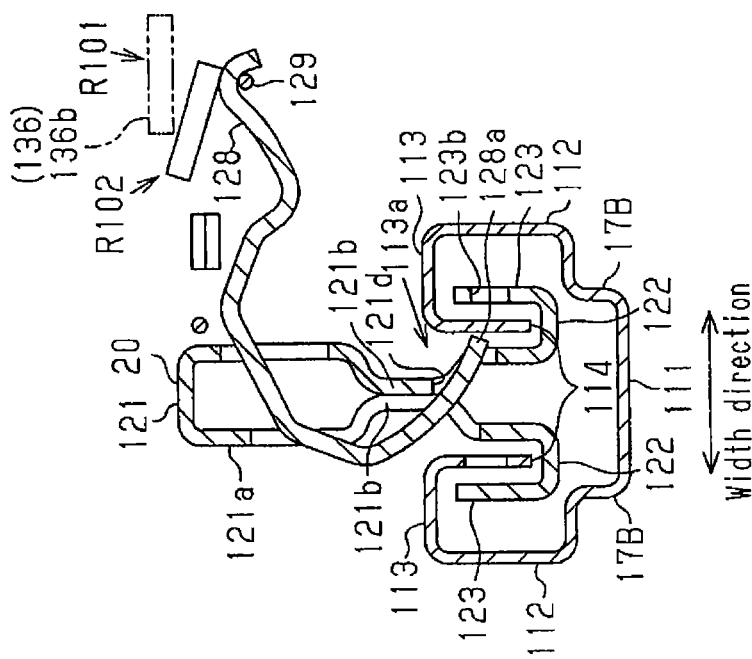

SEAT SLIDE DEVICE

BACKGROUND OF THE DISCLOSURE

The present invention relates to a seat slide device, and more particularly, to a vehicular seat slide device.

A vehicle is provided with a seat slide device capable of moving a movable seat in a front-rear direction and locking the movable seat at an appropriate position.

Patent Document 1 discloses a seat slide device for a vehicle that includes a first seat, a second seat and a third seat in this order from front, and the seat slide device allows the second seat and the third seat to be moved on common rails, which extend in a front-rear direction and are fixed to the vehicle floor. In the seat slide device of Patent Document 1, it is possible to move the third seat to a position in the vicinity of the first seat along the rails by removing the second seat. Patent Document 1 has an advantage that the third seat can be moved to a range where the second seat existed.

Patent Document 2 discloses a seat slide device capable of moving a front passenger seat and rear seats along common lower rails which extend in a front-rear direction and are fixed to a vehicle floor. According to the seat slide device of Patent Document 2, it is possible to move the front passenger seat to a range where the rear seats has existed in a state where the rear seats are moved to rear ends of the lower rails. The front passenger seat is configured to move to a range where the rear seats have been arranged and to be locked by a lock portion at an appropriate position in this range. Patent Document 2 makes it possible to move the front passenger seat to the range where the rear seats have been arranged so that moving properties of the front passenger seat and occupant comfort are improved.

In Patent Document 2, on the lower rails, a range corresponding to the moving range of the driver's seat is defined as a range A, a range corresponding to the moving range of the seat arranged behind the driver's seat is defined as a range B, and a range where the rear seat arranged behind the front passenger seat can move toward the vehicle trunk so that the rear seat can retract is defined as a range C.

In Patent Document 2, the front passenger seat can largely be moved rearward. That is, the front passenger seat can be moved in a wide range including the range A and the range B. In this case, even if an occupant desires to move the front passenger seat to a rear end of the range A in a state where the occupant sits on the front passenger seat, which is arranged in the range A, there is a possibility that the front passenger seat is moved to the range B while mistakenly largely exceeding the range A if the lock portion is unlocked to move the front passenger seat rearward. In this case, the occupant who sits on the front passenger seat needs to return the front passenger seat to the front range A.

In contrast, even if the occupant desires to forwardly move the front passenger seat to the front end of the range B in a state where the front passenger seat is arranged in the range B of the rear seat, there is a possibility that the occupant moves the front passenger seat forward while mistakenly largely exceeding the range B. In this case, it is necessary for the occupant who sits on the front passenger seat to again return the front passenger seat rearward.

Patent Document 1 is not designed for a case in which the movable seat is moved in a state where an occupant is sitting thereon, and does not propose any method for solving the above presented problems.

PATENT DOCUMENT

Patent Document 1: Japanese Laid-Open Patent Publication No. 2-81738
Patent Document 2: Japanese Laid-Open Patent Publication No. 2004-249928

SUMMARY OF THE INVENTION

It is an object of the present invention to provide a seat slide device having a movable seat that can move along lower rails including a front range for front seats and a rear range for rear seats, the seat slide device being capable of preventing an occupant's unintentional movement of the movable seat between the front range and the rear range, and capable of moving the movable seat to the rear range or the front range in accordance with the occupant's intention.

To solve the above presented problems, and in accordance with a first aspect of the present invention, a seat slide device is provided that includes a lower rail, an upper rail, a lock portion, a stopper portion, and a stopper-releasing operating portion. The lower rail is configured to be fixed to a floor of a vehicle, includes a front range and a rear range, and extends in a front-rear direction. The upper rail is configured to support a movable seat and is movable on the lower rail. The lock portion is provided on the upper rail and selectively restricts movement of the upper rail on the lower rail at a plurality of positions in each of the front range and the rear range. The stopper portion stops movement of the upper rail before the upper rail crosses over any one of the front range and the rear range and enters the other range. The stopper-releasing operating portion allows the upper rail to move when the upper rail has been stopped by the stopper portion.

In accordance with a second aspect of the present invention, in the first aspect, the lower rail includes a non-lock range, in which the lock portion cannot restrict movement of the upper rail. The non-lock range is located between the front range and the rear range.

In accordance with a third aspect of the present invention, in the first or second aspect, the stopper portion includes stoppers respectively provided at a rear end of the front range and a front end of the rear range of the lower rail, an engaging member, which is provided on the upper rail and engages with one of the stoppers to restrict movement of the upper rail, and an urging member for urging the engaging member in a direction in which the engaging member engages with the stopper. The engaging member engages with the stopper when the upper rail moves and the engaging member is opposed to the stopper. The stopper-releasing operating portion includes a stopper-releasing lever, which is configured to be provided on the movable seat and disengages the engaging member from the stopper against an urging force of the urging member.

In accordance with a fourth aspect of the present invention, in the first or second aspect, the stopper portion includes a pair of actuators and a controller. The actuators are respectively provided at a rear end of the front range and a front end of the rear range of the lower rail such that the actuators are opposed to each other. Each of the actuators includes an operating member capable of reciprocating between a stop position and a retraction position, and the operating member can contact with the upper rail at the stop position and cannot contact with the upper rail at the retraction position. The controller can operate in any of a prevention mode and a prevention-cancelling mode in a switching manner. The controller controls, in the prevention mode, the actuators such that the operating members of the actuators are arranged at the stop position. The controller controls, in the prevention-cancelling mode, the actuators such that the operating members of the actuators are arranged at the retraction position. When the stopper-releasing operating portion is operated, the controller operates in accordance with the prevention-cancelling mode, and when the stopper-releasing operating portion is not operated, the controller operates in accordance with the prevention mode.

In accordance with a fifth aspect of the present invention, in the second aspect, the seat slide device further includes a detector for detecting the upper rail, which moves in the non-lock range. The stopper portion includes a pair of actuators and a controller. The actuators are respectively provided at a rear end of the front range and a front end of the rear range of the lower rail such that the actuators are opposed to each other. Each of the actuators includes an operating member capable of reciprocating between a stop position and a retraction position. The operating member can contact with the upper rail at the stop position and cannot contact with the upper rail at the retraction position. The controller can operate in any of a prevention mode and a prevention-cancelling mode in a switching manner. The controller controls, in the prevention mode, the actuators such that the operating members of the actuators are arranged at the stop position. The controller controls, in the prevention-cancelling mode, the actuators such that the operating members of the actuators are arranged at the retraction position. After the stopper-releasing operating portion is operated and until the detector completes detection of the upper rail, which moves in the non-lock range, the controller operates in accordance with the prevention-cancelling mode. When the stopper-releasing operating portion is not operated, the controller operates in accordance with the prevention mode.

In accordance with a sixth aspect of the present invention, in the first aspect, the stopper portion includes a single actuator and a controller. The single actuator is opposed to a boundary between the front range and the rear range in the lower rail. The actuator includes an operating member capable of reciprocating between a stop position and a retraction position. The operating member can contact with the upper rail at the stop position and cannot contact with the upper rail at the retraction position. The controller can operate in any of a prevention mode and a prevention-cancelling mode in a switching manner. The controller controls, in the prevention mode, the actuator such that the operating member of the actuator is arranged at the stop position. The controller controls, in the prevention-cancelling mode, the actuator such that the operating member of the actuator is arranged at the retraction position. The controller operates in accordance with the prevention-cancelling mode when the stopper-releasing operating portion is operated, and the controller operates in accordance with the prevention mode when the stopper-releasing operating portion is not operated.

In accordance with a seventh aspect of the present invention, in the first or second aspect, a pair of detectors are respectively provided at a rear end of the front range and a front end of the rear range of the lower rail. The stopper portion includes an actuator and a controller. The actuator is provided on the upper rail. The actuator includes an operating member capable of reciprocating between an engaging position and a disengagement position. The operating member engages with the lower rail at the engaging position and disengages from the lower rail at the disengagement position. The controller is capable of operating in any of a prevention mode and a prevention-cancelling mode in a switching manner. The controller controls, in the prevention mode, the actuator such that the operating member of the actuator is arranged at the engaging position to prevent the upper rail from moving. The controller controls, in the prevention-cancelling mode, the actuator such that the operating member of the actuator is arranged at the disengagement position to allow the upper rail to move. When the detector detects that the upper rail is located at any one of the rear end of the front range and the front end of the rear range, the controller operates in accordance with the prevention mode. When the stopper-releasing operating portion is operated, the controller operates in accordance with the prevention-cancelling mode.

In accordance with an eighth aspect of the present invention, in the second aspect, the stopper portion includes a single actuator and a controller. The actuator is opposed to a portion of the non-lock range of the lower rail. The actuator includes an operating member capable of reciprocating between a stop position and a retraction position. The operating member can contact with the upper rail at the stop position and cannot contact with the upper rail at the retraction position. The controller can operate in any of a prevention mode and a prevention-cancelling mode in a switching manner. The controller controls, in the prevention mode, the actuator such that the operating member of the actuator is arranged at the stop position. The controller controls, in the prevention-cancelling mode, the actuator such that the operating member of the actuator is arranged at the retraction position. When the stopper-releasing operating portion is not operated, the controller operates in accordance with the prevention mode, and when the stopper-releasing operating portion is operated, the controller operates in accordance with the prevention-cancelling mode.

In accordance with a ninth aspect of the present invention, in the first or second aspect, the stopper portion includes stoppers, engaging members, and an urging member. The stoppers are respectively provided at a rear end of the front range and a front end of the rear range of the lower rail. The engaging members are provided on the lower rail such that the engaging members can engage with the stoppers for restricting movement of the upper rail in a state where the engaging members engage with the stoppers. The urging member urges the engaging members in a direction in which the engaging members engage with the stoppers. The stopper-releasing operating portion includes a stopper-releasing lever, which is configured to be provided on the movable seat and disengages the engaging members from the stoppers against an urging force of the urging member.

In accordance with a tenth aspect of the present invention, in the second aspect, the stopper portion includes a stopper provided in the non-lock range of the lower rail, an engaging member provided on the upper rail such that the engaging member can engage with the stopper, and an urging member, which urges the engaging member in a direction in which the engaging member engages with the stopper when the upper rail moves and the engaging member is opposed to the stopper. The stopper-releasing operating portion includes a stopper-releasing lever, which is configured to be provided on the movable seat and disengages the engaging member from the stopper against an urging force of the urging member.

In accordance with an eleventh aspect of the present invention, in any one of the first to tenth aspects, an airbag device having an airbag is provided in front of the movable seat in the vehicle. The front range of the lower rail is included in an airbag protection range in which the airbag of the airbag device expands to protect an occupant, and the rear range of the lower rail is not included in the airbag protection range.

According to the first aspect of the present invention, it is possible to provide the seat slide device that is capable of preventing an occupant's unintentional movement of the movable seat between the front range and the rear range and capable of moving the movable seat to the rear range or the front range in accordance with the occupant's intention.

According to the second aspect of the invention, in the seat slide device provided with the lower rail having the non-lock range between the front range and the rear range where the lock portion cannot restrict movement of the upper rail, it is possible to easily realize the effect of the first aspect.

According to the third aspect of the invention, when the upper rail moves, if the engaging member is opposed to the stopper, the engaging member engages with the stopper, and it is possible to stop movement of the movable seat from the front range to the rear range and from the rear range to the front range. Hence, it is possible to prevent the movable seat from unintentionally moving between the front range and the rear range. If an occupant sitting on the movable seat operates the cancelling lever, it is possible to intentionally move the movable seat from the front range to the rear range or from the rear range to the front range.

According to the fourth aspect of the invention, the pair of actuators is respectively provided at the rear end of the front range and the front end of the rear range of the lower rail such that the actuators are opposed to each other. The controller controls, in accordance with the prevention mode, the actuators such that the operating members are arranged at the stop position. According to this, movement of the movable seat from the front range to the rear range and from the rear range to the front range is stopped. Therefore, it is possible to prevent the movable seat from unintentionally moving between the front range and the rear range. When an occupant sitting on the movable seat operates the stopper-releasing operating portion, the pair of actuators is controlled by the controller which operates in accordance with the prevention-cancelling mode such that the pair of operating members is moved to the retraction position. Hence, it is possible to intentionally move the movable seat from the front range to the rear range or from the rear range to the front range.

According to the fifth aspect of the invention, the pair of actuators is respectively provided at the rear end of the front range and the front end of the rear range of the lower rail such that the actuators are opposed to each other. The controller which operates in accordance with the prevention mode controls the actuators such that the operating members are arranged at the stop position. According to this, movement of the movable seat from the front range to the rear range and from the rear range to the front range is stopped. Therefore, it is possible to prevent the movable seat from unintentionally moving between the front range and the rear range. After an occupant sitting on the movable seat operates the stopper-releasing operating portion and until the detector completes detection of the upper rail which moves in the non-lock range, the controller which operates in accordance with the prevention-cancelling mode controls the pair of actuators such that the operating members are arranged at the retraction position. Hence, it is possible to intentionally move the movable seat from the front range to the rear range or from the rear range to the front range.

According to the sixth aspect of the invention, the controller, which operates in accordance with the prevention mode, controls the single actuator, which is opposed to the boundary between the front range and the rear range of the lower rail, such that the operating member is arranged at the stop position. According to this, movement of the movable seat from the front range to the rear range and from the rear range to the front range is stopped. Hence, it is possible to prevent the movable seat from unintentionally moving between the front range and the rear range. When an occupant sitting on the movable seat operates the stopper-releasing operating portion, the controller, which operates in accordance with the prevention-cancelling mode, controls the pair of actuators such that the operating members are arranged at the retraction position. Hence, it is possible to intentionally move the movable seat from the front range to the rear range or from the rear range to the front range.

According to the seventh aspect of the invention, when the upper rail is detected at the rear end of the front range or the front end of the rear range, the controller operates in accordance with the prevention mode. According to this, since movement of the movable seat from the front range to the rear range and from the rear range to the front range is stopped, it is possible to prevent the movable seat from unintentionally moving between the front range and the rear range. If the stopper-releasing operating portion is operated, the controller operates in accordance with the prevention-cancelling mode. Therefore, it is possible to move the movable seat to another range in accordance with the will of an occupant.

According to the eighth aspect of the invention, when the stopper-releasing operating portion is not operated, the controller operates in accordance with the prevention mode, and the single actuator prevents the movable seat from moving. Therefore, it is possible to prevent the movable seat from unintentionally moving between the front range and the rear range. When the stopper-releasing operating portion is operated, the controller operates in accordance with the prevention-cancelling mode. Therefore, it is possible to move the movable seat to another range in accordance with the will of an occupant.

According to the ninth aspect of the invention, in a state where the engaging members engage the stoppers, which are respectively provided at the rear end of the front range and the front end of the rear range, the engaging members prevent the upper rail from moving. Hence, it is possible to prevent the movable seat from unintentionally moving between the front range and the rear range. When the stopper-releasing operating portion is operated, the engaging members are disengaged from the stoppers against the urging force of the urging member. It is therefore possible to move the movable seat to another range in accordance with the will of an occupant.

According to the tenth aspect of the invention, in a state where the engaging member engages with the stopper provided in the non-lock range, the engaging member prevents the upper rail from moving. Hence, it is possible to prevent the movable seat from unintentionally moving between the front range and the rear range. When the stopper-releasing operating portion is operated, since the engaging member is disengaged from the stopper against the urging force of the urging member, it is possible to move the movable seat to another range in accordance with the will of an occupant.

According to the eleventh aspect of the invention, it is possible to prevent the movable seat from unintentionally moving between the airbag protection range (front range) and the range (rear range) that is not protected by the airbag, and it is possible to move the movable seat to the rear range or the airbag protection range (front range) in accordance with the will of an occupant.

BRIEF DESCRIPTION OF THE DRAWINGS

FIG. 4(a) is a plan view showing a state where the upper rail is incorporated in the lower rail;

FIG. 4(b) is a side view of the state of FIG. 4(a);

FIG. 9(a) is a plan view showing a state where an upper rail is incorporated in a lower rail in a seat slide device of a second embodiment;

FIG. 9(b) is a side view of the state of FIG. 9(a);

FIG. 12(a) is a plan view showing a state where an upper rail is incorporated in a lower rail in a seat slide device of a third embodiment;

FIG. 12(b) is a side view of the state of FIG. 12(a);

FIG. 21(a) is a cross-sectional view of a lower rail and an upper rail in a modification of the first embodiment and corresponds to FIG. 6(a); and FIG. 21(b) is a cross-sectional view showing operation of a stopper lever in the modification of the first embodiment and corresponds to FIG. 6(b).

DETAILED DESCRIPTION OF THE PREFERRED EMBODIMENTS

First Embodiment

A seat slide device 100 according to a first embodiment of the present invention will be described below with reference to FIGS. 1 to 8. In a vehicle to which the seat slide device of the first embodiment is applied, seats arranged on the floor will be described first.

Figure 1:
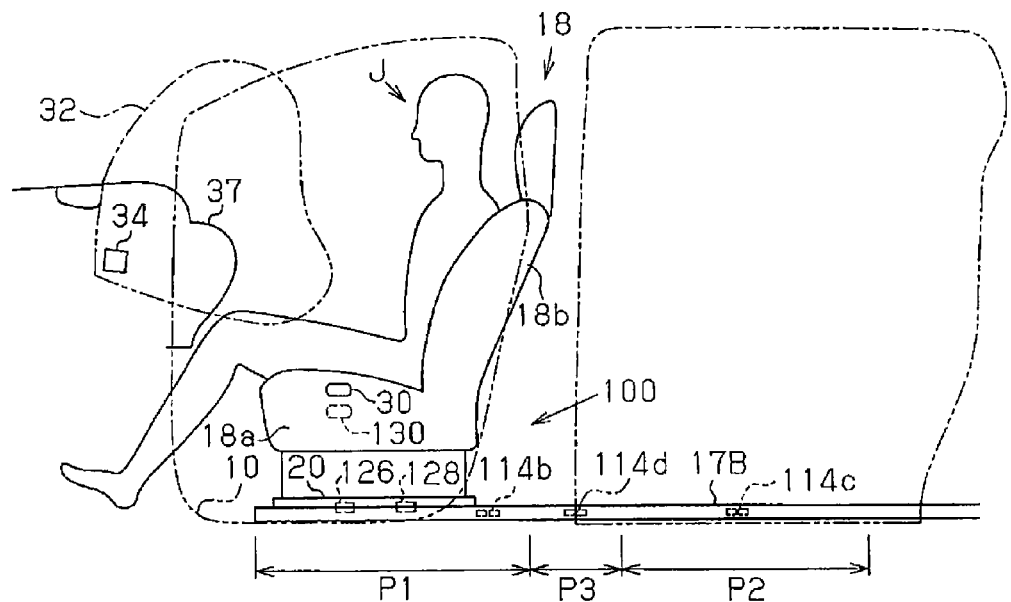
FIG. 1 is a schematic side view showing a state where a movable seat is arranged in a first range in a seat slide device according to a first embodiment of the present invention.
Figure 2:
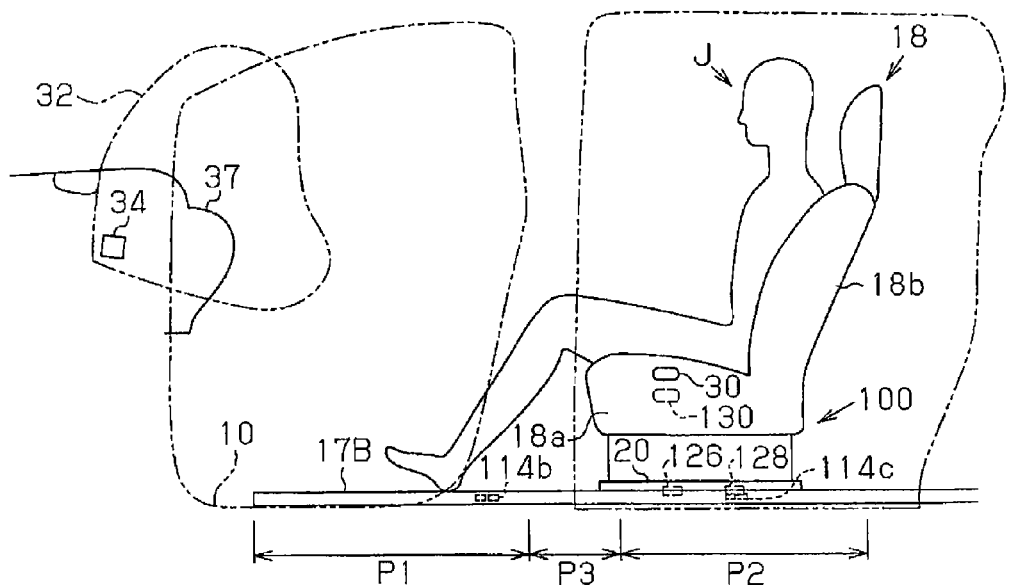
FIG. 2 is a schematic side view showing a state where the movable seat is arranged in a second range in the seat slide device of the first embodiment.
Figure 7:
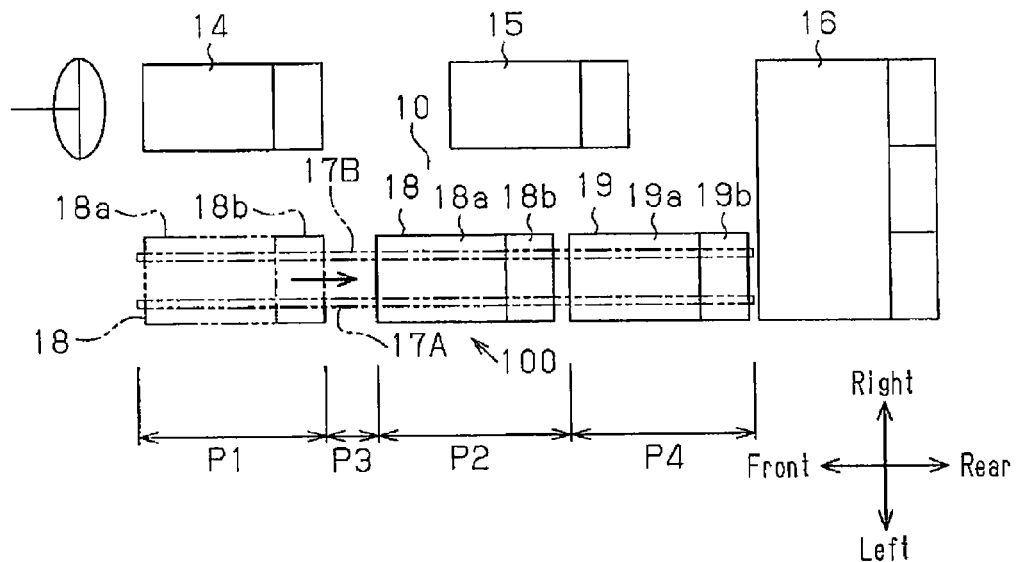
FIG. 7 is a schematic plan view of a vehicle having the seat slide device of the first embodiment.

As shown in FIG. 7, on the floor 10 of the vehicle, there are provided three seat rows including a first seat row, a second seat row and a third seat row arranged in a front-rear direction. In the first embodiment, the first seat row includes a driver's seat 14 arranged on a right side in a vehicle width direction and a front passenger seat 18 arranged on a left side in the vehicle. The second seat row includes a rear seat 15 arranged behind the driver's seat 14 and a movable rear seat 19 arranged behind the front passenger seat 18. The third seat row is composed of a bench-type, third-row seat 16 extending in the vehicle width direction. As shown in FIGS. 1, 2 and 7, a pair of long lower rails 17A and 17B extending in a front-rear direction is arranged on the floor 10 on the side of the front passenger seat (left side in vehicle width direction in this embodiment) such that the lower rails 17A and 17B are separated from each other in parallel. As shown in FIGS. 1 and 7, the front ends of the lower rails 17A and 17B are located on the left side of the front end of the driver's seat 14 and are located on a front portion of the vehicle floor 10. The rear ends of the lower rails 17A and 17B are located in front of the third-row seat 16 and at a position adjacent to the third-row seat 16. Positions of the driver's seat 14 and the rear seat 15 can be adjusted in the front-rear direction by known slide mechanisms (not shown), respectively, and the driver's seat 14 and the rear seat 15 can be locked at the positions after adjustment by known lock mechanisms (not shown).

The front passenger seat 18 and the movable rear seat 19 are arranged on the lower rails 17A and 17B and function as movable seats. The driver's seat 14, the rear seat 15, the third-row seat 16, the front passenger seat 18 and the movable rear seat 19 respectively include seat cushions and seat backs, which are attached to the seat cushions such that they can incline with respect to the seat cushions.

As shown in FIGS. 1 and 7, a pair of upper rails 20 is fixed to a lower portion of a seat cushion 18a of the front passenger seat 18 such that the upper rails 20 are separated from each other in the vehicle width direction. The lower rails 17A and 17B and the upper rails 20 configure the seat slide device 100. The upper rails 20 align with the lower rails 17A and 17B and can move in the front-rear direction along the lower rails 17A and 17B.

As shown in FIG. 7, the lower rails 17A and 17B include a first range P1, a third range P3, a second range P2 and a fourth range P4 in this order from front. In this embodiment, the first range P1 corresponds to a position of the driver's seat 14 and configures a front range. The second range P2 corresponds to a position of the rear seat 15 and configures a rear range. The third range P3 extends between the first range P1 and the second range P2 and configures a non-lock range. The movable rear seat 19 can move in ranges of the second range P2 and the fourth range P4 as shown in FIG. 7. When the movable rear seat 19 is arranged at a position closest to the third-row seat 16 in the fourth range P4, the front passenger seat 18 can move in the remaining range of the entire lengths of the lower rails 17A and 17B, i.e., in a range of the first range P1, the third range P3 and the second range P2 as shown in FIG. 7. The first range P1 and the second range P2 are not limited to the same moving ranges (ranges) as those of the driver's seat 14 and the rear seat 15, and the first range P1 and the second range P2 may be deviated from each other in the front-rear direction.

Since both the lower rails 17A and 17B have the same configurations, the one lower rail 17B will be described below.

Figure 3:
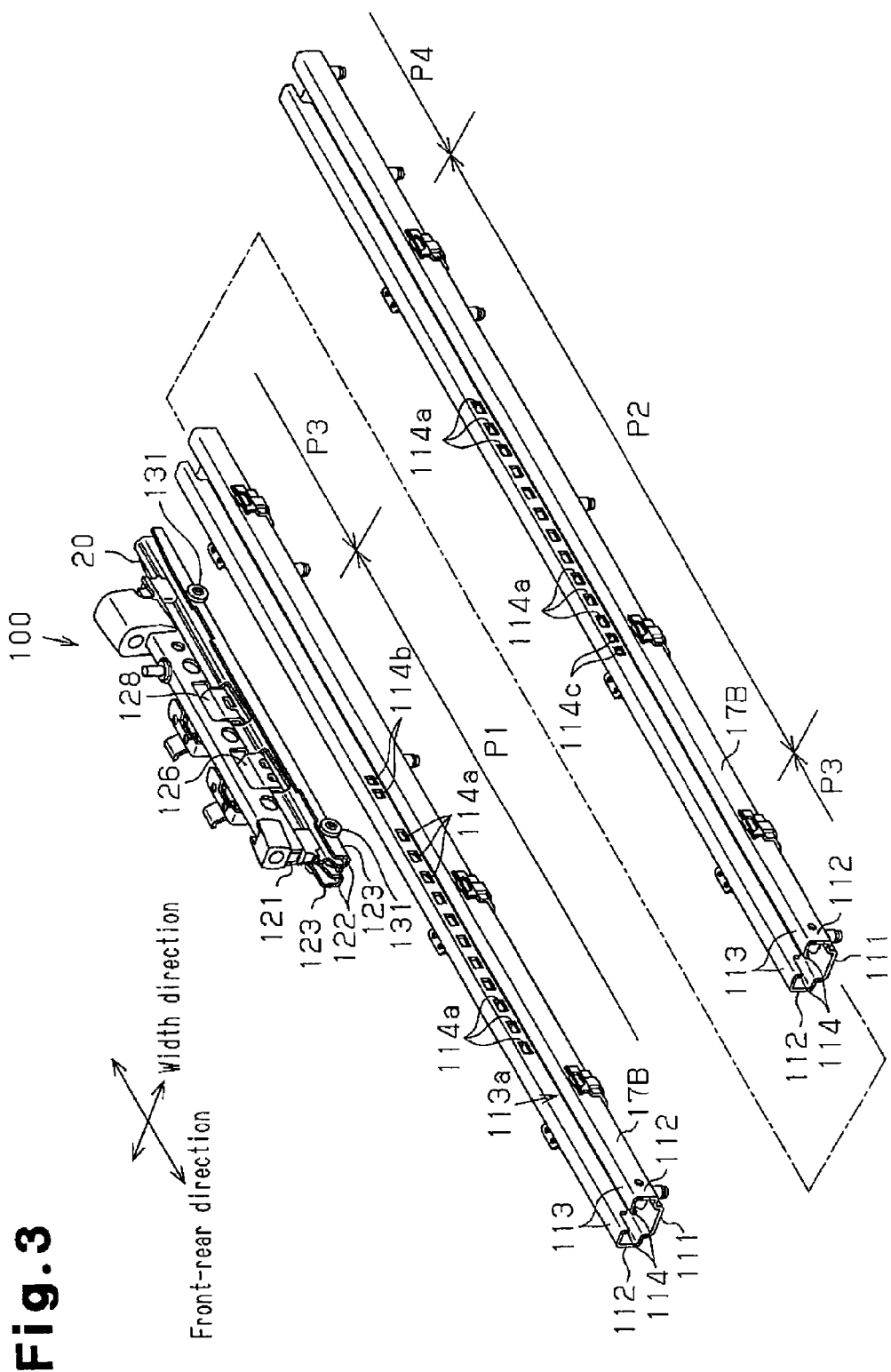
FIG. 3 is an exploded perspective view of lower rails and an upper rail.
Figure 5:
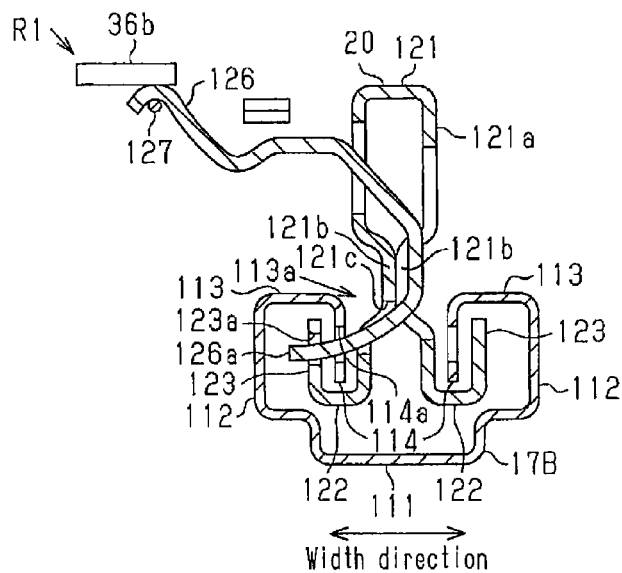
FIG. 5 is a cross-sectional view taken along line 5-5 in FIG. 4(b)

As shown in FIG. 5, the lower rail 17B includes a bottom wall portion 111 having a width in the vehicle width direction and extending in the front-rear direction, a pair of side wall portions 112 standing from both ends of the bottom wall portion 111 of the vehicle width direction, a pair of overhang wall portions 113 extending from upper ends of both the side wall portions 112 along the vehicle width direction such that the overhang wall portions 113 approach each other, and a pair of folded wall portions 114 extending downward from tip ends of both the overhang wall portions 113. The bottom wall portion 111, the side wall portions 112, the overhang wall portions 113 and the folded wall portions 114 of the lower rail 17B are integrally formed together. In the lower rail 17B, an opening 113a which opens upward is defined between both the folded wall portions 114. As shown in FIGS. 3 and 4(b), a plurality of rectangular lock holes 114a are formed in the folded wall portions 114 included in the first range P1 and the second range P2. The lock holes 114a are arranged at a predetermined first interval L1 from one another in a front-rear direction of the lower rail 17B. No lock holes 114a are formed in the folded wall portions 114 in the third range P3.

As shown in FIG. 3, in the folded wall portions 114 included in the first range P1 of the lower rail 17B, and at locations of the folded wall portions 114 posterior to the most rear one of the lock holes 114a, a plurality of (two in the embodiment) rectangular stopper holes 114b is formed at a second interval L2 from each other along the front-rear direction of the lower rail 17B. In the folded wall portions 114 included in the second range P2 of the lower rail 17B, and at locations of the folded wall portions 114 in front of the most front one of the lock holes 114a, a plurality of (two in the embodiment) rectangular stopper holes 114c is formed at a second interval L2 from each other in the front-rear direction of the lower rail 17B. As shown in FIG. 4(b), the second interval L2 is different from the first interval L1 between the lock holes 114a. The stopper holes 114b and 114c function as stoppers. In this embodiment, the first interval L1 between the lock holes 114a is shorter than the second interval L2 between the stopper holes 114b and 114c. Alternatively, the first interval L1 may be longer than the second interval L2.

As shown in FIG. 5, each of the upper rails 20 includes a body wall portion 121, which extends in a vertical direction of the vehicle and extends in the front-rear direction along the opening 113a of the lower rail 17B. The body wall portion 121 of the upper rail 20 includes hollow wall portions 121a extending to surround substantially rectangular spaces in cross sections thereof, and a pair of extended wall portions 121b extending downward from both tip ends of the hollow wall portions 121a such that the extended wall portions 121b are separated from each other. The upper rail 20 further includes a pair of overhang wall portions 122 extending from lower ends of the extended wall portions 121b of the body wall portion 121 in the vehicle width direction in separating directions, and a pair of folded wall portions 123, which extend upward from the tip ends of both the overhang wall portions 122 and are surrounded by the side wall portions 112, the overhang wall portions 113 and the folded wall portions 114 of the lower rail 17B. The body wall portion 121, the overhang wall portions 122 and the folded wall portions 123 of the upper rail are integrally formed together.

As shown in FIG. 3, a plurality of bearings 131, which rotates along the bottom wall portion 111, is attached to the outer surfaces of the folded wall portions 123 of the upper rail 20, and the upper rail 20 is supported by the lower rail 17B with the bearings 131. If the bearings 131 rotate along the bottom wall portion 111, the upper rail 20 is supported such that the upper rail 20 can slide along the front-rear direction of the lower rail 17B.

A plurality of insertion holes 121c (see FIG. 5) is formed in each of the extended wall portions 121b of the upper rail 20 at a predetermined first interval L1 from one another along the front-rear direction of the upper rail 20. The insertion holes 121c are located at positions that can match with the lock holes 114a of the lower rail 17B. Similarly, a plurality of insertion holes 123a are formed also in each of the folded wall portions 123 of the upper rail 20 at the predetermined interval L1 from each other along the front-rear direction of the upper rail 20. In the upper rail 20, the insertion holes 123a of the folded wall portions 123 are opposed to the insertion holes 121c of the extended wall portions 121b in the vehicle width direction.

Figure 6A:
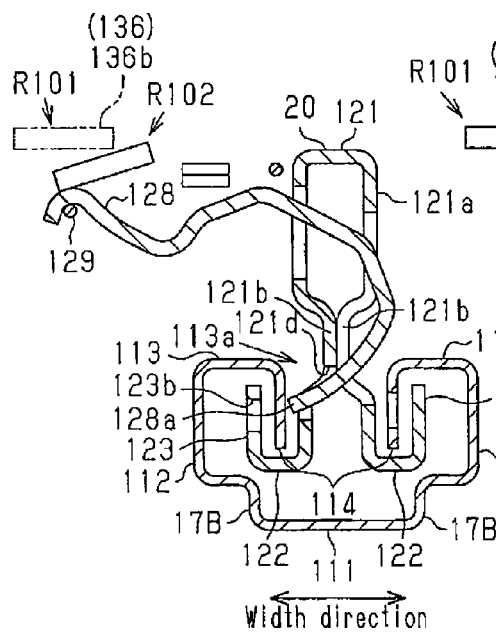
FIG. 6(a) is a cross-sectional view taken along line 6-6 in FIG. 4(b)
Figure 6B:
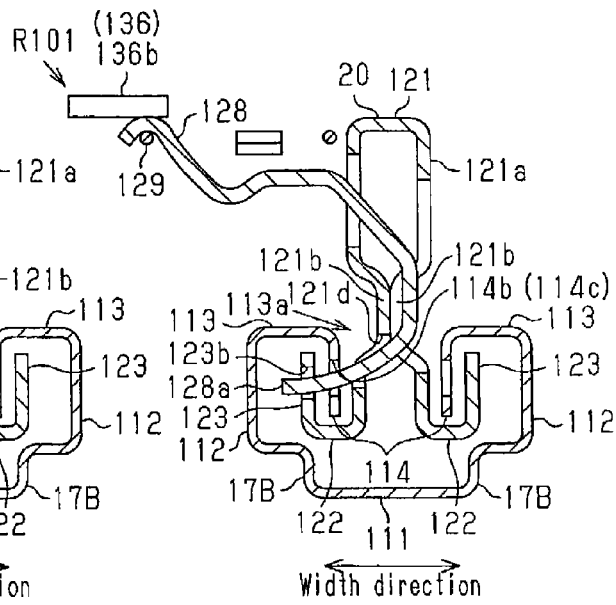
FIG. 6(b) is a cross-sectional view showing operation of a stopper lever.

A plurality of insertion holes 121d (see FIGS. 6(a) and 6(b)) is formed in the extended wall portions 121b of the upper rail 20 at locations closer to the rear end of the upper rail 20 than the insertion holes 121c at a second interval L2 from one another in the front-rear direction of the upper rail 20. The insertion holes 121d of the extended wall portions 121b of the upper rail 20 are located at positions which can match with the stopper holes 114b and stopper holes 114c which are adjacent to each other in the front-rear direction of the lower rail 17B. Similarly, a plurality of insertion holes 123b is formed in the folded wall portions 123 of the upper rail 20 at locations closer to the rear end of the upper rail 20 than the insertion holes 123a at the second interval L2 from one another in the front-rear direction of the upper rail 20. In the upper rail 20, the insertion holes 123b of the folded wall portions 123 are opposed to the insertion holes 121d of the extended wall portions 121b in the vehicle width direction.

A lock lever 126, which functions as a lock portion, is connected to the upper rail 20 such that the lock lever 126 can pivot about a pivot axis, which extends in the front-rear direction of the upper rail 20. As shown in FIGS. 5 and 4(b), a plurality of (three in the embodiment) lock pawls 126a is formed on the lock lever 126 at the predetermined first interval L1 from one another. The lock pawls 126a extend downward and are curved into C-shapes to project outward in the vehicle width direction. The lock pawls 126a penetrate the body wall portion 121 and are introduced into the opening 113a. As the lock lever 126 pivots, the lock pawls 126a can selectively enter and exit the insertion holes 121c and 123a shown in FIG. 5. When the positions of the insertion holes 121c of the extended wall portions 121b, the positions of the insertion holes 123a of the folded wall portions 123 and the positions of the lock holes 114a of the lower rail 17B align with each other, if the lock pawls 126a of the lock lever 126 are inserted into the insertion holes 121c and 123a and the lock holes 114a, relative movement between the lower rail 17B and the upper rail 20 is restricted, and the front passenger seat 18 is also positioned.

As shown in FIG. 4(a), one end of a torsion spring 127 is attached, from below, to an end of the lock lever 126 on the side separating from the lock pawl 126a. The other end of the torsion spring 127 is fixed to the body wall portion 121 of the upper rail 20. The lock pawls 126a of the lock lever 126 are always urged by the torsion spring 127 toward a side where the lock pawls 126a are inserted into the insertion holes 121c and 123a, i.e., in a direction restricting relative movement between the lower rail 17B and the upper rail 20. A resilient member such as a leaf spring and a helical spring may be used instead of the torsion spring 127 for example. By rotating the lock lever 126 against urging force of the torsion spring 127, the lock pawls 126a can be made to exit the insertion holes 123a and the lock holes 114a. If the lock pawls 126a exit the insertion holes 123a of the folded wall portions 123 of the upper rail 20 and from the lock holes 114a of the folded wall portions 114, relative movement between the lower rail 17B and the upper rail 20 is allowed.

Figure 8:
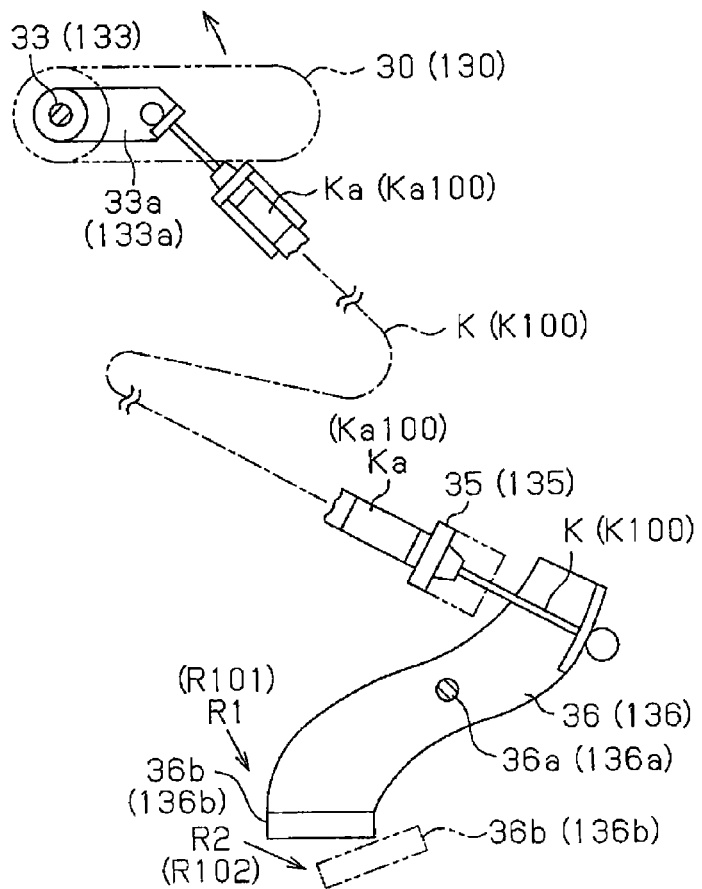
FIG. 8 is a schematic explanatory diagram of an unlock lever and a stopper-releasing lever.

As shown in FIGS. 1 and 8, a pivot shaft 33 is pivotally supported by a frame (not shown) of the seat cushion 18a, and an unlock lever 30 is integrally connected to the pivot shaft 33 on a side of the seat cushion 18a (left side of seat cushion 18a in the embodiment). The pivot shaft 33 is provided with a return spring (not shown). When the unlock lever 30 is operated to pivot, the return spring returns the unlock lever 30 to a position before the unlock lever 30 is operated. The unlock lever 30 is manually operated. A lever member 33a is integrally fixed to the pivot shaft 33, and leading ends of a pair of cables K inserted into outer tubes Ka are connected to the lever member 33a. By pivoting the unlock lever 30, the cables K are operated. FIG. 8 shows only one of the pair of cables K for operating the lock lever 126 of the upper rail 20, which moves along the lower rail 17B. The other cable K (not shown) is used for operating the lock lever 126 of the upper rail 20, which moves along the lower rail 17A. A mechanism for operating the lock lever 126 of the upper rail 20 that moves along the lower rail 17A is the same as a linkage mechanism (first linkage mechanism) that operates the lock lever 126 of the upper rail 20, which moves along the lower rail 17B. Therefore, description of the former mechanism will be omitted.

As shown in FIG. 8, an end of the outer tube Ka of the cable K is fixed to a lower portion of the seat cushion 18a through a bracket 35. A lower portion of the seat cushion 18a is provided with a shaft 36a, and an operation lever 36 is supported such that a central portion of the operation lever 36 can pivot about the shaft 36a. A terminal end of the cable K is connected to an upper end of the operation lever 36.

As shown in FIGS. 5 and 8, the operation lever 36 can reciprocate between a standby position R1 and an operation position R2 where a lower end 36b of the operation lever 36 is arranged below the standby position R1. If the cable K is operate by the unlock lever 30 in a state where the operation lever 36 is arranged in the standby position R1, the operation lever 36 is pivoted about the shaft 36a counterclockwise as viewed in FIG. 8. According to this, the lower end 36b of the operation lever 36 is moved to the operation position R2.

When the operation lever 36 is moved from the standby position R1 to the operation position R2, the lower end 36b presses and downwardly moves an upper end of the lock lever 126 against urging force of the torsion spring 127. According to this, the lock pawls 126a exit the insertion holes 123a and the lock holes 114a from a state where the lock lever 126 shown in FIG. 5 restricts relative movement between the lower rail 17B and the upper rail 20, and relative movement therebetween is allowed.

If the manual operation of the unlock lever 30 is stopped, the operation lever 36 pivots about the shaft 36a clockwise as viewed in FIG. 8 through the cables K by the return spring (not shown). By this pivoting motion, the lower end 36b of the operation lever 36 returns from the operation position R2 to the standby position R1 as shown in FIG. 8. As a result, the lock pawls 126a are inserted into the insertion holes 121c, the lock holes 114a and the insertion holes 123a by the urging force of the torsion spring 127, and relative movement between the lower rail 17B and the upper rail 20 is restricted.

A stopper lever 128 is connected to a portion of the upper rail 20 closer to a rear end of the upper rail 20 than the lock lever 126 such that the stopper lever 128 can pivot about a pivot axis extending in a front-rear direction of the upper rail 20. The stopper lever 128 functions as an engaging member.

As shown in FIGS. 6(a) and 4(b), a plurality of (two in the embodiment) stopper pawls 128a are formed on the stopper lever 128 at the second interval L2 from each other. The stopper pawls 128a extend downward and are curved into C-shapes to project outward in the vehicle width direction. The stopper pawls 128a penetrate the body wall portion 121 and are introduced into the opening 113a. As the stopper lever 128 pivots, the stopper pawls 128a can selectively enter and exit the insertion holes 121d and insertion holes 123b shown in FIG. 6(b). When the positions of the insertion holes 121d of the extended wall portions 121b of the upper rail 20, the positions of the insertion holes 123b of the folded wall portions 123 and the positions of the stopper holes 114b (or stopper holes 114c) of the lower rail 17B align with each other, the stopper pawls 128a of the stopper lever 128 are inserted into the insertion holes 121d, the insertion holes 123b and the stopper holes 114b (or stopper holes 114c). According to this, relative movement between the lower rail 17B, the upper rail 20 and thus the front passenger seat 18 is prevented, and movement of the upper rail 20 is stopped. Since the first interval L1 and the second interval L2 are different from each other, the stopper lever 128 is prevented from being inserted into the lock hole 114a.

The stopper holes 114b are arranged such that when the stopper lever 128 is inserted into the stopper hole 114b, the upper rail 20 (front passenger seat 18) is located behind the first range P1. The stopper holes 114c are arranged such that when the stopper lever 128 is inserted into stopper hole 114c, the upper rail 20 and thus the front passenger seat 18 are located in front of the second range P2 (see FIG. 2).

As shown in FIG. 4(a), one end of a torsion spring 129 is attached, from below, to an end of the stopper lever 128 on the side separating from the stopper pawls 128a. The other end of the torsion spring 129 is fixed to the body wall portion 121 of the upper rail 20. As shown in FIG. 6(b), the stopper lever 128 is always urged by the torsion spring 129 such that the stopper lever 128 pivots toward a side where the stopper pawls 128a are inserted into the insertion holes 121d and the insertion holes 123b, i.e., such that the stopper lever 128 pivots in a direction restricting relative movement between the lower rail 17B and the upper rail 20. The torsion spring 129 functions as an urging member. The urging member is not limited to the torsion spring 129, and a resilient member such as a leaf spring and a helical spring may be used as the urging member.

As shown in FIG. 6(a), the stopper lever 128 is rotated against the urging force of the torsion spring 129, the stopper pawls 128a exit the insertion holes 123b and the stopper holes 114b (or stopper holes 114c), and relative movement between the lower rail 17B and the upper rail 20 is allowed.

A pivot shaft 133 is pivotally supported by a frame (not shown) of the seat cushion 18a. As shown in FIGS. 1 and 8, a stopper-releasing lever 130 for disengaging the stopper lever 128 from the lower rail 17B is integrally connected to the pivot shaft 133 on a side (right side of seat cushion 18a in the embodiment) of the seat cushion 18*a*. The stopper-releasing lever 130 functions as a stopper-releasing operating portion.

A linkage mechanism (second linkage mechanism, hereinafter) for disengaging the stopper lever 128 from the lower rail 17B by the stopper-releasing lever 130 has the same members as those configuring the linkage member (first linkage mechanism, hereinafter) provided between the unlock lever 30 and the lock lever 126. Therefore, "100" is added to reference signs of the lever member 33*a*, the cables K, the outer tube Ka, the bracket 35, the operation lever 36, the shaft 36*a*, the lower end 36*b*, the standby position R1 and the operation position R2 configuring the first linkage mechanism, and detailed description of these members of the second linkage mechanism will be omitted. The second linkage mechanism includes a lever member 133*a*, cables K100, an outer tube Ka100, a bracket 135, an operation lever 136, a shaft 136*a* and a lower end 136*b* (see FIG. 8). As shown in FIG. 6(*a*), the operation lever 136 can reciprocate between a standby position R101 and an operation position R102 where the lower end 136*b* of the operation lever 36 is located below the standby position R101.

The second linkage mechanism for operating the stopper lever 128 of the upper rail 20, which moves along the lower rail 17A, is the same as the second linkage mechanism for operating the stopper lever 128 of the upper rail 20, which moves along the lower rail 17B and therefore, description of the former second linkage mechanism will be omitted.

When the upper rail 20 moves between the first range P1 and the second range P2, if the non-operated stopper lever 128 is opposed to the stopper holes 114*b* and 114*c*, the stopper lever 128 is inserted into the stopper hole 114*b* and 114*c* and is engaged with these holes. According to this, the upper rail 20 and thus the front passenger seat 18, which move between the first range P1 and the second range P2, can once stop at a rear end of the first range P1 and a front end of the second range P2.

In the first embodiment, the stopper lever 128, the stopper holes 114*b* and 114*c*, and the torsion spring 129 configure a stopper portion.

As shown in FIG. 1, an airbag device is provided in an instrument panel 37 in a vehicle interior. The airbag device includes an airbag 32 accommodated in its folded state and an inflator 34 for supplying gas into the airbag 32. When the airbag 32 of the airbag device expands at the time of collision of the vehicle, if the front passenger seat 18 is in the first range P1, the airbag 32 and a seat belt (not shown) can protect an occupant J who is sitting on the front passenger seat 18. Therefore, the first range P1 is referred to as an airbag protection range.

As shown in FIGS. 1 and 2, the airbag 32 is configured to receive gas supplied from the inflator 34 and to be inflated and deployed from the instrument panel 37 toward the front passenger seat.

Operation of First Embodiment

Operation of the seat slide device 100 configured as described above will be described. First, assume that the upper rail 20 and thus the front passenger seat 18 are arranged in the first range P1, the lock pawls 126*a* of the lock lever 126 are inserted into the lock holes 114*a*, and the stopper pawls 128*a* of the stopper lever 128 are not inserted into the stopper holes 114*b*. At this time, relative movement between the lower rail 17B and the upper rail 20 is restricted by the lock pawls 126*a* of the lock lever 126. At this time, the stopper pawls 128*a* of the stopper lever 128 are in abutment against the folded wall portions 114 as shown in FIG. 6(*a*), and the stopper pawls 128*a* are not inserted into the stopper holes 114*b*.

When the occupant J sitting on the front passenger seat 18 tries to move the front passenger seat 18 from the first range P1 to the second range P2 as shown in FIG. 1, the occupant J manually operates the unlock lever 30 and moves the operation lever 36 from the standby position R1 to the operation position R2 (see FIG. 8). At this time, the lower end 36*b* of the operation lever 36 presses and downwardly moves the upper end of the lock lever 126 shown in FIG. 5 against the urging force of the torsion spring 127. According to this, the lock lever 126 is rotated such that the lock pawls 126*a* exit the insertion holes 123*a* and the lock holes 114*a*, and relative movement between the lower rail 17B and the upper rail 20 is allowed. Thereafter, the occupant J moves the upper rail 20 toward the second range P2. At the time of this movement, if the stopper pawls 128*a* are opposed to the stopper holes 114*b* of the first range P1, the stopper lever 128 is rotated by the urging force of the torsion spring 129, and the stopper pawls 128*a* are inserted into the stopper holes 114*b* and the insertion holes 123*b*. According to this, the upper rail 20 and thus the front passenger seat 18 are prevented from moving and they stop (see FIG. 6(*b*)). The stopping of the upper rail 20 in this manner allows the occupant J to confirm his or her intention to move outside from the first range P1.

When the occupant J desires to move to the second range P2, the stopper-releasing lever 130 is manually operated to move the operation lever 136 from the standby position R101 to the operation position R102 (see FIG. 8). At this time, the lower end 136*b* of the operation lever 136 presses and downwardly moves the upper end of the stopper lever 128 shown in FIG. 6(*b*) against urging force of the torsion spring 129. According to this, the stopper lever 128 is rotated such that the stopper pawls 128*a* exit the insertion holes 123*b* and the stopper holes 114*b*, and relative movement between the lower rail 17B and the upper rail 20 is allowed.

In this state, the occupant J moves the upper rail 20 toward the second range P2 through the third range P3. At this time, if the occupant J stops the operation of the stopper-releasing lever 130, the lower end 136*b* of the operation lever 136 returns to the standby position R101, but the stopper pawls 128*a* of the stopper lever 128 slide in a state where the stopper pawls 128*a* contact with the folded wall portions 114 as shown in FIG. 6(*a*).

At the time of this movement, if the stopper pawls 128*a* are opposed to the stopper holes 114*c* of the second range P2, the stopper lever 128 is rotated by the urging force of the torsion spring 129, and the stopper pawls 128*a* are inserted into the stopper holes 114*c* and the insertion holes 123*b*. According to this, the upper rail 20 and thus the front passenger seat 18 are prevented from moving and they stop. At this time, the occupant J can confirm that the upper rail 20 has entered the second range P2. Thereafter, the occupant J operates the stopper-releasing lever 130 to cancel the restriction of relative movement between the lower rail 17B and the upper rail 20 conducted by the stopper lever 128 and then, it is possible to adjust a position of the upper rail 20 in the front-rear direction in the second range P2. At the time of this adjustment, it is possible to lock the upper rail 20 at a desired position in the second range P2 by appropriately operating the unlock lever 30.

When it is desired to move the upper rail 20 toward the first range P1 in a state where the upper rail 20 is arranged in the second range P2, the occupant J cancels the locked state by the unlock lever 30 and then, the upper rail 20 is moved toward the first range P1. At the time of this movement, if the stopper pawls 128a are opposed to the stopper holes 114b of the second range P2, the stopper lever 128 is rotated by urging force of the torsion spring 129, and the stopper pawls 128a are inserted into the stopper holes 114b and the insertion holes 123b. According to this, the upper rail 20 and thus the front passenger seat 18 are prevented from moving and they stop (see FIG. 6(b)). The stopping of the upper rail 20 in this manner allows the occupant J to confirm his or her intention to move outside from the second range P2.

If the occupant J desires to move from the second range P2 to the first range P1, the stopper-releasing lever 130 is manually operated to move the operation lever 136 from the standby position R101 to the operation position R102 (see FIG. 8). At this time, the lower end 136b of the operation lever 136 presses and downwardly moves the upper end of the stopper lever 128 shown in FIG. 6(b) against urging force of the torsion spring 129. According to this, the stopper lever 128 is rotated such that the stopper pawls 128a exit the insertion holes 123b and the stopper hole 114b, and relative movement between the lower rail 17B and the upper rail 20 is allowed.

In this state, the occupant J moves the upper rail 20 toward the first range P1 through the third range P3. At the time of this movement, if the occupant J stops the operation of the stopper-releasing lever 130, the lower end 136b of the operation lever 136 returns to the standby position R101, but the stopper pawls 128a of the stopper lever 128 slide in a state where the stopper pawls 128a contact with the folded wall portions 114 as shown in FIG. 6(a).

At the time of this movement, if the stopper pawls 128a are opposed to the stopper holes 114b of the first range P1, the stopper lever 128 is rotated by urging force of the torsion spring 129, and the stopper pawls 128a are inserted into the stopper holes 114c and the insertion holes 123b. According to this, the upper rail 20 and thus the front passenger seat 18 are prevented from moving and they stop. At this time, the occupant J can confirm that the upper rail 20 has entered the first range P1. Thereafter, the occupant J operates the stopper-releasing lever 130 to cancel the restriction of relative movement between the lower rail 17B and the upper rail 20 conducted by the stopper lever 128 and then, it is possible to adjust a position of the upper rail 20 in the front-rear direction in the first range P1. At the time of this adjustment, it is possible to lock the upper rail 20 at a desired position in the second range P2 by appropriately operating the unlock lever 30.

According to the first embodiment, the following advantages are achieved.

(1) The seat slide device 100 of the first embodiment includes the lower rails 17A and 17B, which are fixed to the vehicle floor 10 and extend in the front-rear direction, such that the lower rails 17A and 17B include the first range P1 (front range) for the front seats and the second range P2 (rear range) for the rear seats, and the front passenger seat 18 (movable seat) having the upper rails 20 capable of moving on the lower rails 17A and 17B. Each of the upper rails 20 is provided with the lock lever 126 (lock portion) to selectively restrict movement of the upper rails 20 on the lower rails 17A and 17B in the positions in the first range P1 for the front seats and the second range P2 for the rear seats of the lower rails 17A and 17B. The seat slide device 100 includes a stopper portion having the stopper lever 128 for stopping the upper rails 20, which move from one of the first range P1 and the second range P2 to the other range in the lower rails 17A and 17B, and the stopper-releasing lever 130 (stopper-releasing operating portion) capable of moving the upper rails 20, which are stopped by the stopper portion. As a result, according to the seat slide device 100 of the first embodiment, the front passenger seat 18 can be moved to the first range P1 or the second range P2 in accordance with the will of the occupant J. When the occupant J does not desire to move the front passenger seat 18 from one of the first range P1 and the second range P2 to the other range, it is possible to prevent the front passenger seat 18 from moving between the first range P1 and the second range P2.

(2) In the seat slide device 100 of the first embodiment, the lower rails 17A and 17B have the third range P3 (non-lock range), where it is not possible to restrict the movement of the upper rails 20 by the lock lever 126 (lock portion) between the first range P1 and the second range P2. As a result, it is possible to easily realize the above advantage (1).

(3) According to the seat slide device 100 of the first embodiment, the stopper portion includes the stopper holes 114b and 114c (stoppers) provided at the rear end of the first range P1 (front range) and the front end of the second range P2 (rear range) of the lower rails 17A and 17B, and the stopper lever 128 (engaging member), which is provided on the upper rail 20 and engaged with (i.e., inserted into) one of the stopper holes 114b and 114c (stoppers) to restrict the movement of the upper rail 20. The stopper portion further includes the torsion spring 129 (urging member) for urging the stopper lever 128 in a direction in which the stopper lever 128 is engaged with the stopper holes 114b and 114c. If the stopper lever 128 is opposed to the stopper holes 114b and 114c (stoppers) when the upper rails 20 move, the stopper lever 128 is engaged with the stopper holes 114b and 114c (stoppers). The stopper-releasing lever 130 (stopper-releasing operating portion) is provided on the front passenger seat 18 (movable seat) and disengages the stopper lever 128 (engaging member) from the stopper holes 114b and 114c (stoppers) against urging force of the torsion spring 129 (urging member).

As a result, according to the first embodiment, if the stopper lever 128 (engaging member) is opposed to the stopper holes 114b and 114c (stoppers) provided in the rear end of the first range P1 and the front end of the second range P2 of the lower rails 17A and 17B, the stopper lever 128 (engaging member) is inserted into and engaged with the stopper holes 114b and 114c (stoppers). Therefore, it is possible to stop the movement of the front passenger seat 18 (movable seat) from the first range P1 to the second range P2, and from the second range P2 to the first range P1 by the stopper lever 128. Hence, it is possible to prevent the front passenger seat 18 (movable seat) from unintentionally moving between the first range P1 and the second range P2. Further, if the occupant J sitting on the front passenger seat 18 (movable seat) operates the stopper-releasing lever 130, it is possible to intentionally move the front passenger seat 18 (movable seat) from the first range P1 to the second range P2, or from the second range P2 to the first range P1.

(4) According to the seat slide device 100 of the first embodiment, the airbag 32 is provided in front of the front passenger seat 18, i.e., in a front portion of the vehicle interior. The first range P1 of the lower rails 17A and 17B is included in the airbag protection range, where the airbag 32 expands to protect an occupant, and the second range P2 is not included in the airbag protection range. That is, the occupant sitting on the front passenger seat 18 arranged in the first range P1 can be protected by the airbag 32. As a result, according to the first embodiment, it is possible to provide the seat slide device capable of preventing the front passenger seat 18 (movable seat) from unintentionally moving between the airbag protection range (first range P1) and a range (second range P2) where an occupant is not protected by the expanded airbag 32, and capable of moving the front passenger seat 18 (movable seat) to the second range P2 or the airbag protection range (first range P1) intentioned by the occupant J.

Second Embodiment

Figure 10:
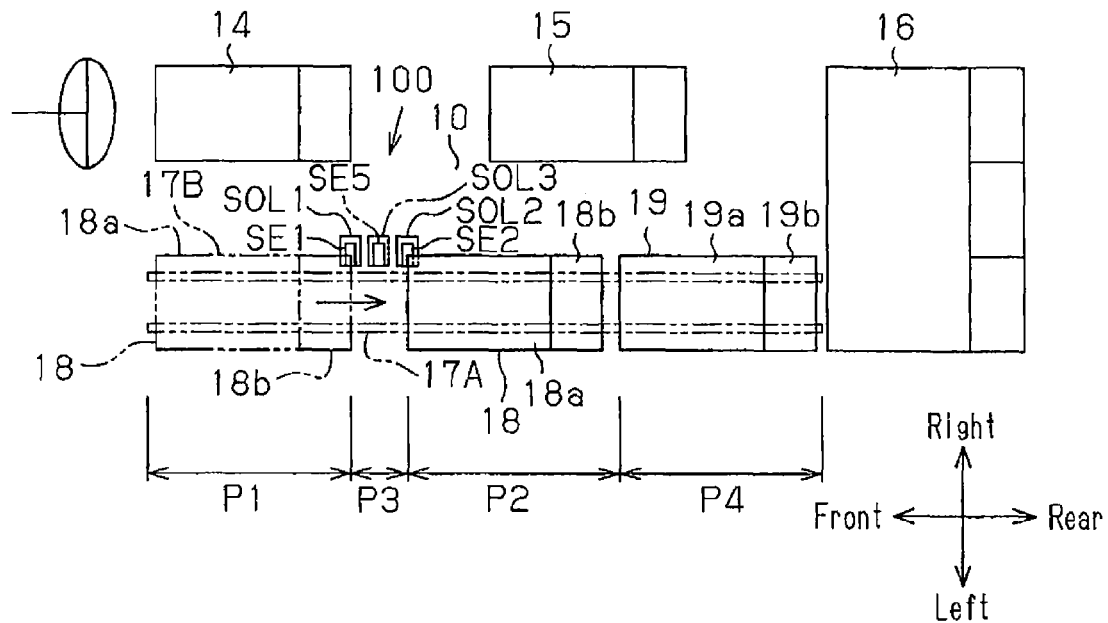
FIG. 10 is a schematic plan view of a vehicle having the seat slide device of the second embodiment.
Figure 11:
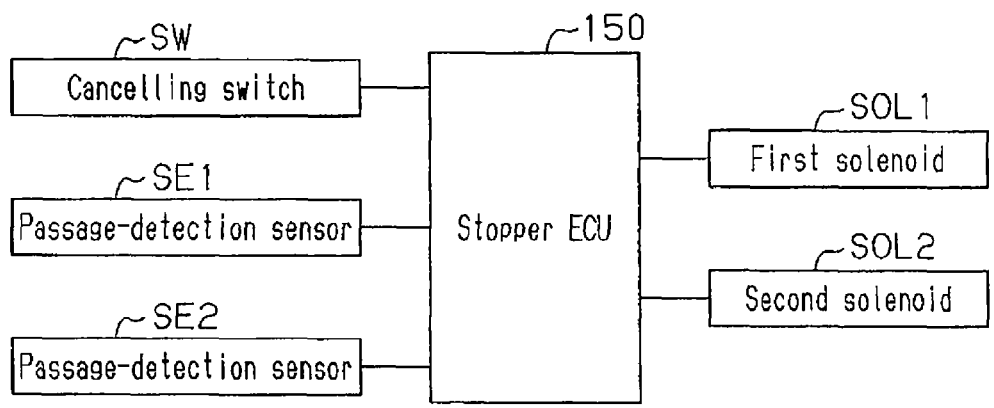
FIG. 11 is an electric block diagram of a stopper control device in the seat slide device of the second embodiment.

Next, a seat slide device 100 of a second embodiment will be described with reference to FIGS. 9 to 11.

Like or the same reference numerals are given to those components that are like or the same as the corresponding components of the first embodiment, and detailed explanations are omitted.

In the seat slide device 100 of the second embodiment, the stopper lever 128, the stopper holes 114b and 114c, the stopper-releasing lever 130 and the second linkage mechanism in the first embodiment are omitted. Instead, a first solenoid SOL1 and a second solenoid SOL2, which function as actuators, are fixed to a vehicle floor 10 such that the solenoids SOL1, SOL2 are opposed to a rear end of a first range P1 and a front end of a second range P2.

As shown in FIG. 9(a), plungers SOLa of the first and second solenoids SOL1 and SOL2 are arranged on the movement paths of upper rails 20 and can reciprocate between a stop position Q1 capable of interfering with the upper rails 20 and a retraction position Q2, which retracts from the movement paths of the upper rails 20 and does not interfere with the upper rails 20. The plungers SOLa function as operating members. FIG. 9(a) only shows the plunger SOLa of the first solenoid SOL1. As shown in FIG. 10, passage-detection sensors SE1 and SE2 are provided on the first and second solenoids SOL1 and SOL2. The passage-detection sensors SE1 and SE2 function as detectors that detect passage of the upper rails 20 through the third range P3. Each of the passage-detection sensors SE1 and SE2 may be a contact type sensor or a non-contact type sensor such as a photoelectric sensor (transmission type photoelectric sensor, regression reflection type photoelectric sensor), an ultrasonic sensor and a proximity sensor, and the passage-detection sensors SE1 and SE2 are not limited.

A cancelling switch SW is provided at a specific position (e.g., left or right surface) of a seat cushion 18a of a front passenger seat 18. The cancelling switch SW functions as a stopper-releasing operating portion, which is manually operated by an occupant J. As shown in FIG. 11, in the second embodiment, a vehicle is provided with a stopper ECU 150 (controller), which is a stopper control device for controlling the first and second solenoids SOL1 and SOL2. The stopper ECU 150 is electrically connected to the cancelling switch SW, the passage-detection sensors SE1 and SE2, the first and second solenoids SOL1 and SOL2. The stopper ECU 150 is operated in accordance with a prevention-cancelling mode for holding the plungers SOLa of the first and second solenoids SOL1 and SOL2 at the retraction positions until the passage-detection sensors SE1 and SE2 complete detection of the upper rails 20 after the cancelling switch SW is switched to an ON state. When the cancelling switch SW is not switched to the ON state, the stopper ECU 150 operates the plungers SOLa of the first and second solenoids SOL1 and SOL2 in accordance with a prevention mode for holding the plungers SOLa of the first and second solenoids SOL1 and SOL2 at the stop positions. The cancelling switch SW may be a position holding type switch or an automatically returning type switch.

In the second embodiment, the stopper portion is composed of the first solenoid SOL1, the second solenoid SOL2 and the stopper ECU 150 (controller).

Operation of Second Embodiment

Operation of the seat slide device 100 of the second embodiment will be described.

First, the upper rails 20 and thus the front passenger seat 18 are arranged in the first range P1, a lock lever 126 is inserted into a lock hole 114a, the stopper ECU 150 is operated in accordance with the prevention mode, and the plunger SOLa of the first solenoid SOL1 at the rear end of the first range P1 and the plunger SOLa of the second solenoid SOL2 at the front end of the second range P2 project into the stop positions Q1.

When the occupant J sitting on the front passenger seat 18 shown in FIG. 1 moves the front passenger seat 18 from the first range P1 to the second range P2, the occupant J manually operates the unlock lever 30 to cancel the locked state established by the lock lever 126, and relative movement between the lower rail 17B and the upper rail 20 is allowed. Thereafter, the occupant J moves the upper rail 20 toward the second range P2. At the time of this movement, if the rear end of the upper rail 20 abuts against the plunger SOLa of the first solenoid SOL1, movement of the upper rail 20 and thus movement of the front passenger seat 18 are prevented by the plunger SOLa, and the upper rail 20 stops. The stopping of the upper rail 20 in this manner allows the occupant J to confirm his or her intention to move outside from the first range P1.

If the occupant J desires to move into the second range P2, the occupant J manually switches the cancelling switch SW to the ON state. When the cancelling switch SW is brought into the ON state, the stopper ECU 150 is shifted into the prevention-cancelling mode, and the stopper ECU 150 controls the plungers SOLa of the first and second solenoids SOL1 and SOL2 to move into the retraction positions Q2. According to this, the restriction of relative movement between the lower rail 17B and the upper rail 20 by the plunger SOLa of the first solenoid SOL1 is cancelled, and relative movement between the lower rail 17B and the upper rail 20 is allowed.

In this state, the occupant J moves the upper rail 20 toward the second range P2 through the third range P3. After the cancelling switch SW is switched to the ON state, until the passage-detection sensor SE1 detects that the passage of the upper rail 20 is completed and the passage-detection sensor SE2 detects that the passage of the upper rail 20 is completed, the stopper ECU 150 controls the first and second solenoids SOL1 and SOL2 such that the plungers SOLa thereof are held at the retraction positions Q2. For example, the passage-detection sensors SE1 and SE2 output high signals when the upper rail 20 is detected, and output low signals when the upper rail 20 is not detected. After the cancelling switch SW is switched to the ON state, until the output of the passage-detection sensor SE2 becomes the low signal from the high signal, the stopper ECU 150 operates in accordance with the prevention-cancelling mode. After the upper rail 20 passes through the entire range of the third range P3 and detection of the upper rail 20 is completed by the passage-detection sensor SE2, the stopper ECU 150 is shifted from the prevention-cancelling mode into the prevention mode. According to this, the stopper ECU 150 controls the plungers SOLa of the first and second solenoids SOL1 and SOL2 to move from the retraction positions Q2 to the stop positions Q1. After the upper rail 20 enters the second range P2, if the occupant J appropriately operates the unlock lever 30 to adjust a position of the upper rail 20 in the front-rear direction in the second range P2, and the upper rail 20 and thus the front passenger seat 18 are locked at desired positions.

To move the upper rail 20 from the second range P2 to the first range P1, the occupant J cancels the locked state by the unlock lever 30, and moves the upper rail 20 toward the first range P1. At the time of this movement, the stopper ECU 150 operates in accordance with the prevention mode, and the front end of the upper rail 20 abuts against the plunger SOLa of the second solenoid SOL2 arranged at the stop position Q1. According to this, the upper rail 20 and thus the front passenger seat 18 are prevented from moving, and the upper rail 20 stops. The stopping of the upper rail 20 in this manner allows the occupant J to confirm his or her intention to move outside from the second range P2.

If the occupant J desires to move to the first range P1, the occupant J manually switches the cancelling switch SW to the ON state. When the cancelling switch SW is brought into the ON state, the stopper ECU 150 is shifted from the prevention mode to the prevention-cancelling mode, and controls the plungers SOLa of the first and second solenoids SOL1 and SOL2 to move to the retraction positions Q2. According to this, the restriction of relative movement between the lower rail 17B and the upper rail 20 by the plunger SOLa of the second solenoid SOL2 is cancelled, and relative movement between the lower rail 17B and the upper rail 20 is allowed.

In this state, the occupant J moves the upper rail 20 toward the first range P1 through the third range P3. After the cancelling switch SW is switched to the ON state and until the passage-detection sensor SE2 detects that the passage of the upper rail 20 is completed and the passage-detection sensor SE1 detects that the passage of the upper rail 20 is completed, the stopper ECU 150 operates in accordance with the prevention-cancelling mode. That is, until the output of the passage-detection sensor SE1 becomes a low signal from a high signal after the cancelling switch SW is switched to the ON state, the stopper ECU 150 operates in accordance with the prevention-cancelling mode. According to this, the stopper ECU 150 controls the first and second solenoids SOL1 and SOL2 such that the plungers SOLa of the first and second solenoids SOL1 and SOL2 are held at the retraction positions Q2. After the upper rail 20 passes through the entire range of the third range P3 and detection of the upper rail 20 is completed by the passage-detection sensor SE1, the stopper ECU 150 returns from the prevention-cancelling mode to the prevention mode. According to this, the stopper ECU 150 controls the plungers SOLa of the first and second solenoids SOL1 and SOL2 to move from the retraction positions Q2 to the stop positions Q1.

After the upper rail 20 enters the first range P1, the occupant J appropriately operates the unlock lever 30, thereby adjusting a position of the upper rail 20 in the front-rear direction in the first range P1, and the upper rail 20 and thus the front passenger seat 18 are locked at desired positions.

According to the second embodiment, the following advantages are achieved.

(1) The seat slide device 100 of the second embodiment is provided with the passage-detection sensors SE1 and SE2 (detectors) for detecting the upper rail 20, which moves in the third range P3 (non-lock range). The stopper portion includes the first and second solenoids SOL1 and SOL2 (pair of actuators), which are respectively opposed to the rear end of the first range P1 (front range) and the front end of the second range P2 (rear range) of the lower rails 17A and 17B, and the stopper ECU 150 (controller), which controls the first and second solenoids SOL1 and SOL2. Each of the first and second solenoids SOL1 and SOL2 includes the plunger SOLa (operating member), which can reciprocate between the stop position and the retraction position. The plunger SOLa can contact with the upper rail 20 at the stop position, and cannot contact with the upper rail 20 at the retraction position. The stopper ECU 150 can operate in accordance with the prevention mode and the prevention-cancelling mode. The stopper ECU 150 arranges the plunger SOLa at the stop position in the prevention mode, and arranges the plunger SOLa at the retraction position in the prevention-cancelling mode. After the cancelling switch SW (stopper-releasing operating portion) is operated and until the passage-detection sensors SE1 and SE2 (detectors) detect that passage of the upper rail 20 through the third range P3 is completed, the stopper ECU 150 operates in accordance with the prevention-cancelling mode. If the completion of passage of the upper rail 20 is detected, the stopper ECU 150 is shifted from the prevention-cancelling mode to the prevention mode. When the cancelling switch SW (stopper-releasing operating portion) is not operated, the stopper ECU 150 controls the first and second solenoids SOL1 and SOL2 (actuators) in accordance with the prevention mode.

As a result, according to the second embodiment, the stopper ECU 150 in the prevention mode allows the front passenger seat 18 (movable seat) to be moved from the first range P1 to the second range P2, and the movement of the front passenger seat 18 (movable seat) from the second range P2 to the first range P1 to be stopped. Hence, it is possible to prevent the front passenger seat 18 (movable seat) from unintentionally moving between the first range P1 and the second range P2. After the cancelling switch SW (stopper-releasing operating portion) is operated by the occupant J sitting to the front passenger seat 18 (movable seat) and until completion of the passage of the upper rail 20 through the third range P3 (non-lock range) is detected by the passage-detection sensors SE1 and SE2 (detectors), the stopper ECU 150 operates in accordance with the prevention-cancelling mode. The stopper ECU 150 in the prevention-cancelling mode controls the pair of first and second solenoids SOL1 and SOL2 such that the plungers SOLa thereof are arranged at the retraction position, where the plungers SOLa cannot contact with the upper rail 20. Hence, it is possible to move the front passenger seat 18 from the first range P1 to the second range P2, or from the second range P2 to the first range P1 in accordance with intention of the occupant J.

Third Embodiment

Next, a seat slide device 100 of a third embodiment will be described with reference to FIGS. 12 to 14. In the third embodiment, a solenoid SOL is fixed to an upper rail 20 through a bracket 40 as shown in FIGS. 12(a) and 12(b), instead of the first and second solenoids SOL1 and SOL2 in the second embodiment. The solenoid SOL of the third embodiment is one example of an actuator, and includes a plunger SOLa as an operating member.

Figure 13:
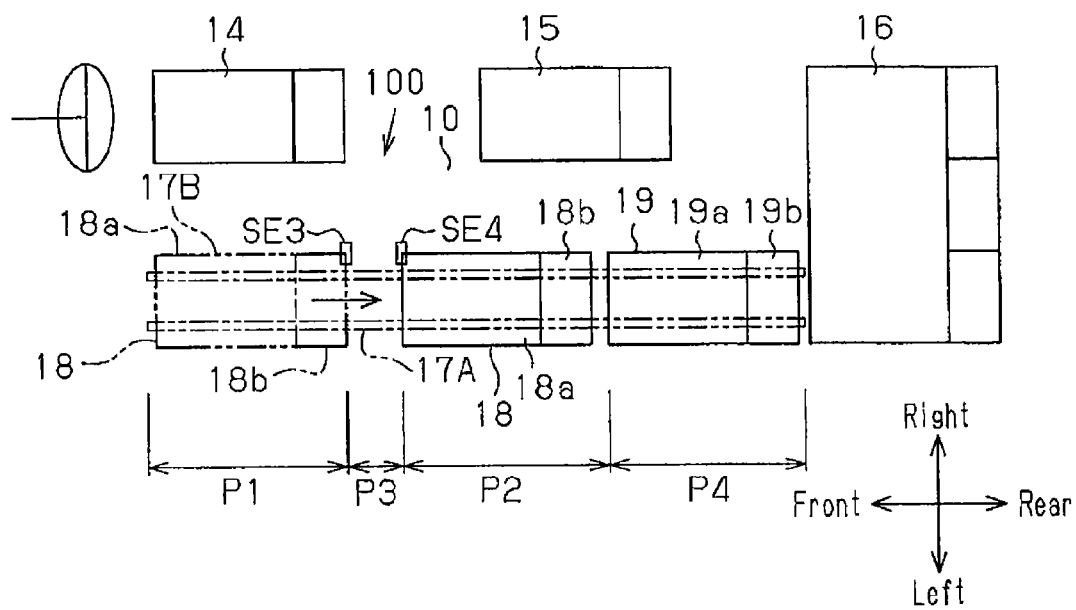
FIG. 13 is a schematic plan view of a vehicle having the seat slide device of the third embodiment.

As shown in FIG. 13, in the third embodiment, a pair of detecting sensors SE3 and SE4 is fixed to the vehicle floor 10. The detecting sensor SE3 is arranged to detect that the upper rail 20 is located at the rear end of a first range P1 before the upper rail 20 enters a third range P3 from the first range P1. The detecting sensor SE4 is arranged to detect that the upper rail 20 is located at the front end of a second range P2 before the upper rail 20 enters the third range P3 from the second range P2. Each of the detecting sensors SE3 and SE4 is one example of a detector, and may be a contact type sensor or a non-contact type sensor such as a photoelectric sensor (transmission type photoelectric sensor, regression reflection type photoelectric sensor), an ultrasonic sensor and a proximity sensor. That is, the detecting sensors SE3 and SE4 are not limited to any particular type.

Figure 14:
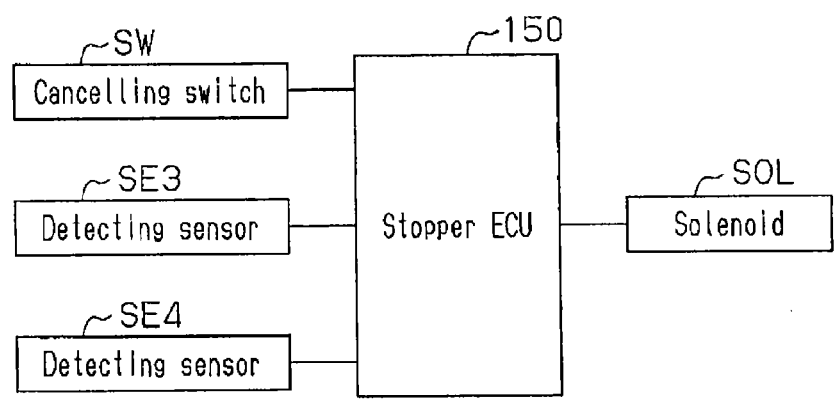
FIG. 14 is an electric block diagram of a stopper control device in the seat slide device of the third embodiment.

As shown in FIG. 14, a cancelling switch SW is provided at a specific position (e.g., left or right surface) of a seat cushion 18a of a front passenger seat 18. The cancelling switch SW functions as a stopper-releasing operating portion, which is manually operated by an occupant. A vehicle is provided with a stopper ECU 150, which is a stopper control device for controlling the solenoid SOL. The stopper ECU 150 is electrically connected to the cancelling switch SW, the detecting sensors SE3 and SE4 and the solenoid SOL. The stopper control device is one example of a controller. The cancelling switch SW may be a position holding type switch or an automatically returning type switch.

The stopper ECU 150 can operate in accordance with a prevention mode and a prevention-cancelling mode. A pair of through holes 11a is formed in a side wall portion 112 of the rear end of the first range P1 and a side wall portion 112 at the front end of the second range P2 of the lower rail 17B. When the cancelling switch SW is in an OFF state and when the detecting sensor SE3 or SE4 detects the upper rail 20, the stopper ECU 150 operates in accordance with the prevention mode. In the prevention mode, as shown in FIG. 12(a), the stopper ECU 150 makes the plunger SOLa of the solenoid SOL project, arranges the plunger SOLa at an engaging position Q3, where the plunger SOLa is engaged with a through hole 112a, and holds this state. FIG. 12(a) shows only the through hole 112a of in the first range P1.

If the detecting sensor SE3 or SE4 detects the upper rail 20, the solenoid SOL instantaneously makes the plunger SOLa project. Hence, the pair of through holes 112a is respectively provided in the side wall portions 112, which are opposed to the solenoid SOL (i.e., plunger SOLa) on the upper rail 20, when the detecting sensors SE3 and SE4 detect the upper rail 20.

When the stopper ECU 150 operates in accordance with the prevention mode, if the cancelling switch SW is switched to an ON state, the stopper ECU 150 is shifted to the prevention-cancelling mode. At the same time, time-counting is started by a timer, the ON state of the cancelling switch SW is continued for predetermined prevention-cancelling mode time, and the stopper ECU 150 operates in accordance with the prevention-cancelling mode. In this prevention-cancelling mode, the stopper ECU 150 pulls out the plunger SOLa of the solenoid SOL from the through hole 112a as shown in FIG. 12(a), and holds the plunger SOLa in a disengagement position Q4, where engagement with the lower rail 17B is cancelled. The prevention-cancelling mode time is set sufficiently longer than time during which the upper rail 20 is made to pass through the third range P3 by an occupant.

Alternatively, the timer may be omitted. In this case, an occupant may maintain the cancelling switch SW in the OFF state, and the upper rail 20 may pass through the third range P3 in a state where the stopper ECU 150 continues operating in accordance with the prevention-cancelling mode.

In the third embodiment, the stopper portion is composed of the solenoid SOL and the stopper ECU 150 (controller).

Operation of Third Embodiment

Operation of the seat slide device 100 of the third embodiment will be described.

First, assume that the upper rail 20 and thus the front passenger seat 18 are arranged in the first range P1 and the solenoid SOL is arranged at the disengagement position Q4. Since the operation of the lock lever 126 is the same as that of the first embodiment, description thereof will be omitted.

As shown in FIG. 13, when an occupant sitting on the front passenger seat 18 moves the upper rail 20 toward the second range P2, if the detecting sensor SE3 detects the upper rail 20, the stopper ECU 150 is shifted to the prevention mode, and the stopper ECU 150 operates the solenoid SOL attached to the upper rail 20. According to this operation, the plunger SOLa arranged at the disengagement position Q4 is inserted into the through hole 112a of the side wall portion 112 of the lower rail 17B in the first range P1, and the plunger SOLa is arranged at the engaging position Q3. Since the operation of the plunger SOLa is much faster than the occupant's moving speed of the plunger SOLa, the upper rail 20 abuts against the plunger SOLa which moved to the engaging position Q3, the upper rail 20 and thus the front passenger seat 18 are prevented from moving, and the upper rail 20 stops.

Stopping of the upper rail 20 in this manner allows the occupant J to confirm his or her intention to move to the second range P2.

If the occupant desires to move to the second range P2, the cancelling switch SW is manually switched to the ON state. When the cancelling switch SW is brought into the ON state, the stopper ECU 150 is shifted to the prevention-cancelling mode, and the stopper ECU 150 controls the plunger SOLa of the solenoid SOL to move to the disengagement position Q4. According to this, restriction of movement of the upper rail 20 by the plunger SOLa of the solenoid SOL is cancelled, and relative movement between the lower rail 17B and the upper rail 20 is allowed. In this state, the occupant moves the upper rail 20 toward the second range P2 through the third range P3.

When the upper rail 20 is moved from the second range P2 to the first range P1, if the detecting sensor SE4 detects the upper rail 20, the stopper ECU 150 is shifted to the prevention mode and operates the solenoid SOL. By this operation, the plunger SOLa arranged at the disengagement position Q4 is inserted into the through hole 112a of the side wall portion 112 of the lower rail 17B in the second range P2, and the plunger SOLa is arranged at the engaging position Q3. Since the operation of the plunger SOLa is much faster than the occupant's moving speed of the front passenger seat 18, the upper rail 20 abuts against the plunger SOLa, which has moved to the engaging position Q3, the upper rail 20 and thus the front passenger seat 18 are prevented from moving, and the upper rail 20 stops.

The stopping of the upper rail 20 in this manner allows the occupant to confirm his or her intention to move to the first range P1.

If the occupant desires to move to the first range P1, the cancelling switch SW is manually switched to the ON state. When the cancelling switch SW is brought into the ON state, the stopper ECU 150 is shifted to the prevention-cancelling mode, and the stopper ECU 150 controls the plunger SOLa of the solenoid SOL to move to the disengagement position Q4. According to this, the restriction of movement of the upper rail 20 by the plunger SOLa of the solenoid SOL is cancelled, and relative movement between the lower rail 17B and the upper rail 20 is allowed. In this state, the occupant moves the upper rail 20 toward the first range P1 through the third range P3.

According to the third embodiment, the following advantages are achieved.

(1) In the seat slide device 100 of the third embodiment, the detecting sensors SE3 and SE4 (detectors), which detect the front passenger seat 18 (movable seat), are respectively provided at the rear end of the first range P1 (front range) and the front end of the second range P2 (rear range) of the lower rail 17B. The stopper portion includes the solenoid SOL (actuator), which is provided on the upper rail 20 and has the plunger SOLa (operating member), and the stopper ECU 150 (controller), which controls the solenoid SOL. The plunger SOLa of the solenoid SOL can reciprocate between the engaging position Q3, where the plunger SOLa can engage with the lower rail 17B, and the disengagement position Q4, where the plunger SOLa is disengaged from the lower rail 17B. The stopper ECU 150 can operate in accordance with the prevention mode and the prevention-cancelling mode. In the prevention mode, the stopper ECU 150 arranges the plunger SOLa of the solenoid SOL at the engaging position Q3 to prevent the upper rail 20 from moving. In the prevention-cancelling mode, the stopper ECU 150 arranges the plunger SOLa of the solenoid SOL at the disengagement position Q4 to allow the movement of the upper rail 20.

When the detecting sensor SE3 (detector) detects that the front passenger seat 18 is located at the rear end of the first range P1 (front range) or when the detecting sensor SE4 (detector) detects that the front passenger seat 18 is located at the front end of the second range (rear range), the stopper ECU 150 is shifted to the prevention mode. When the cancelling switch SW is switched to the ON state, the stopper ECU 150 is shifted to the prevention-cancelling mode. As a result, according to the third embodiment, the stopper ECU 150 in the prevention mode can stop the movement of the front passenger seat 18 (movable seat) from the first range P1 to the second range P2 and from the second range P2 to the first range P1. Hence, it is possible to prevent the front passenger seat 18 (movable seat) from unintentionally moving between the first range P1 and the second range P2.

Fourth Embodiment

Figure 15:
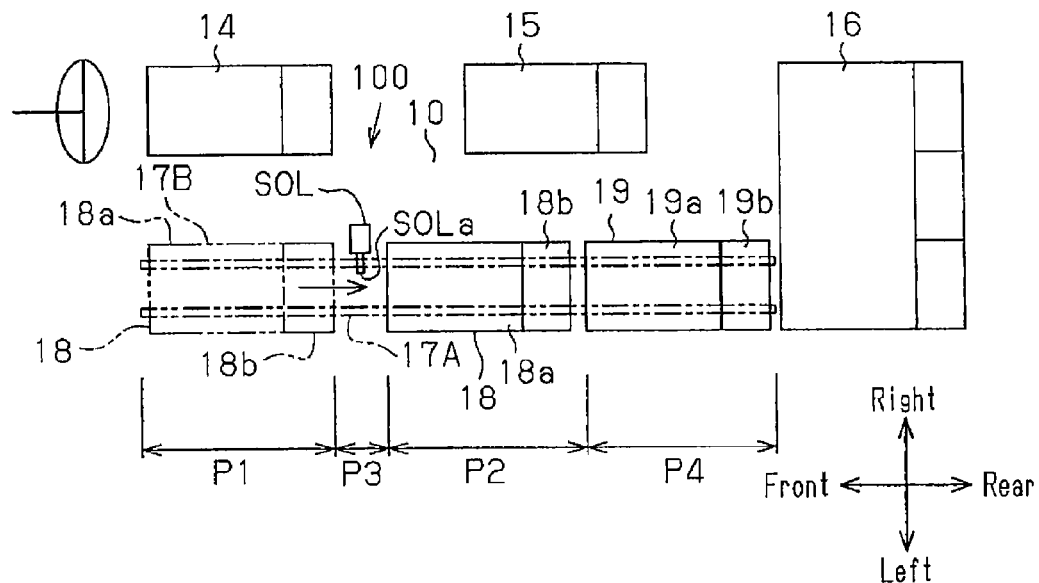
FIG. 15 is a schematic plan view of a vehicle having a seat slide device of a fourth embodiment.
Figure 16:
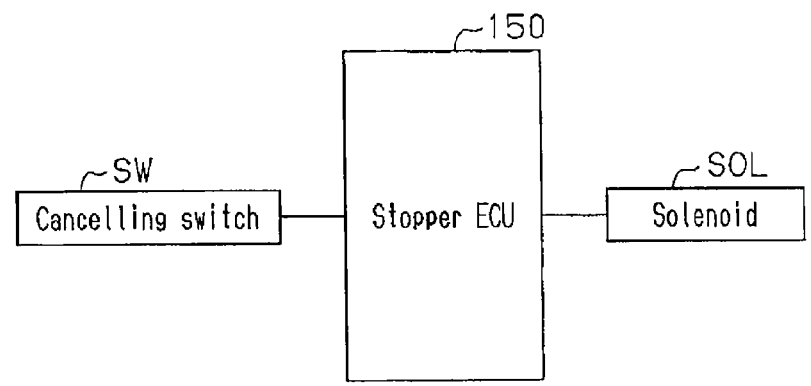
FIG. 16 is an electric block diagram of a stopper control device in the seat slide device of the fourth embodiment.

Next, a seat slide device 100 of a fourth embodiment will be described with reference to FIGS. 15 and 16. In the fourth embodiment, in the configuration of the second embodiment, a single solenoid SOL fixed to the vehicle floor 10 is opposed to a lower rail 17B of a third range P3 (non-lock range) as shown in FIG. 15, instead of the first solenoid SOL1, the second solenoid SOL2, the passage-detection sensor SE1 and the passage-detection sensor SE2. The solenoid SOL of the fourth embodiment includes a plunger SOLa, which functions as an operating member.

A cancelling switch SW is provided at a specific position (e.g., left or right surface) of a seat cushion 18a of a front passenger seat 18. The cancelling switch SW functions as a stopper-releasing operating portion, which is manually operated by an occupant. As shown in FIG. 16, a vehicle is provided with a stopper ECU 150, which is a stopper control device for controlling the solenoid SOL. The stopper ECU 150 is electrically connected to the cancelling switch SW and the solenoid SOL. The stopper control device is one example of a controller.

When the cancelling switch SW is in an OFF state, the stopper ECU 150 operates in accordance with a prevention mode for holding the plunger SOLa of the solenoid SOL in a stop position. When the cancelling switch SW is in an ON state, the stopper ECU 150 operates in accordance with a prevention-cancelling mode for holding the plunger SOLa of the solenoid SOL in a retraction position. Since the stop position and the retraction position are the same as those of the second embodiment, description thereof will be omitted.

In the fourth embodiment, the stopper portion is composed of the solenoid SOL and the stopper ECU 150 (controller).

Operation of Fourth Embodiment

Operation of the seat slide device 100 of the fourth embodiment will be described.

First, an upper rail 20 and thus a front passenger seat 18 are arranged in a first range P1, a lock lever 126 is inserted into a lock hole 114a, and the stopper ECU 150 operates in accordance with the prevention mode. At this time, the stopper ECU 150 controls the plunger SOLa of the solenoid SOL of a third range P3 to project to the stop position.

As shown in FIG. 15, an occupant sitting on a front passenger seat 18 moves the front passenger seat 18 from the first range P1 to a second range P2, the occupant manually operates an unlock lever 30 to cancel the locked state of the lock lever 126, thereby allowing relative movement between the lower rail 17B and the upper rail 20. Thereafter, the occupant moves the upper rail 20 toward the second range P2. At the time of this movement, if a rear end of the upper rail 20 abuts against the plunger SOLa of the solenoid SOL, relative movement between the upper rail 20 and the front passenger seat 18 is prevented and the upper rail 20 stops. The stopping of the upper rail 20 in this manner allows the occupant to confirm his or her intention to move to the second range P2.

If the occupant desires to move to the second range P2, the cancelling switch SW is manually switched to the ON state. When the cancelling switch SW is brought into the ON state, the stopper ECU 150 is shifted to the prevention-releasing mode, and the stopper ECU 150 controls the plunger SOLa of the solenoid SOL to move to the retraction position. According to this, the restriction of relative movement between the lower rail 17B and the upper rail 20 by the plunger SOLa of the solenoid SOL is cancelled, and relative movement therebetween is allowed.

After the movement of the upper rail 20 to the second range P2 is completed, if the occupant switches the cancelling switch SW from the ON state to the OFF state, the stopper ECU 150 is shifted from the prevention-cancelling mode to the prevention mode, and the stopper ECU 150 controls the plunger SOLa of the solenoid SOL to move from the retraction position to the stop position. The occupant appropriately operates the unlock lever 30 to adjust a position of the upper rail 20 in the front-rear direction in the second range P2, and the upper rail 20 can be locked at a desired position.

When the upper rail 20 is moved from the second range P2 to the first range P1, the occupant cancels the locked state by the unlock lever 30 to move the upper rail 20 toward the first range P1. At the time of this movement, if the stopper ECU 150 operates in accordance with the prevention mode, the front end of the upper rail 20 abuts against the plunger SOLa of the solenoid SOL arranged at the stop position. According to this, the upper rail 20 and thus the front passenger seat 18 are prevented from moving, and the upper rail 20 stops. The stopping of the upper rail 20 in this manner allows the occupant to confirm his or her intention to move outside from the second range P2.

If the occupant desires to move to the first range P1, the cancelling switch SW is manually switched to the ON state. When the cancelling switch SW is brought into the ON state, the stopper ECU 150 is shifted from the prevention mode to the prevention-cancelling mode, and the stopper ECU 150 controls the plunger SOLa of the solenoid SOL to move to the retraction position Q2. According to this, the restriction of relative movement between the lower rail 17B and the upper rail 20 by the plunger SOLa of the solenoid SOL is cancelled, and relative movement therebetween is allowed.

In this state, the occupant moves the upper rail 20 toward the first range P1 through the third range P3. After the upper rail 20 passes through the entire range of the third range P3, if the occupant switches the cancelling switch SW from the ON state to the OFF state, the stopper ECU 150 is shifted from the prevention-cancelling mode to the prevention mode, and controls the plunger SOLa of the solenoid SOL to move from the retraction position to the stop position. If the occupant appropriately operates the unlock lever 30, it is possible to adjust a position of the upper rail 20 in the front-rear direction in the first range P1, and to lock the upper rail 20 at a desired position.

According to the fourth embodiment, the following advantages are achieved.

(1) In the seat slide device 100 of the fourth embodiment, the stopper portion includes the single solenoid SOL (actuator) opposed to a portion of the lower rail 17B in the third range P3 (non-lock range), and the stopper ECU 150 (controller), which controls three solenoid SOL. The solenoid SOL includes the plunger SOLa capable of reciprocating between the stop position and the retraction position. The plunger SOLa can contact with the upper rail 20 at the stop position and cannot contact with the upper rail 20 at the retraction position. In the prevention mode, the stopper ECU 150 arranges the plunger SOLa at the stop position, and in the prevention-cancelling mode, the stopper ECU 150 arranges the plunger SOLa at the retraction position.

When the cancelling switch SW (stopper-releasing operating portion) is operated, the stopper ECU 150 is shifted to the prevention-cancelling mode, and when the cancelling switch SW is not operated, the stopper ECU 150 controls the solenoid SOL in accordance with the prevention mode. As a result, according to the fourth embodiment, by the stopper ECU 150 in the prevention mode, it is possible to move the front passenger seat 18 (movable seat) from the first range P1 to the second range P2, and to stop the movement of the front passenger seat 18 (movable seat) from the second range P2 to the first range P1. Hence, it is possible to prevent the front passenger seat 18 (movable seat) from unintentionally moving between the first range P1 and the second range P2.

As a modification of the fourth embodiment, the single solenoid SOL may be provided at any one of the rear end of the first range P1 and the front end of the second range P2 instead of arranging the single solenoid SOL on the lower rail 17B of the third range P3.

In the fourth embodiment, the solenoid SOL is fixed to the vehicle floor 10 such that the solenoid SOL is opposed to the lower rail 17B. However, the same advantages are achieved even if the solenoid SOL is fixed to the vehicle floor 10 such that the solenoid SOL is opposed to the lower rail 17A.

Fifth Embodiment

Next, a seat slide device 100 of a fifth embodiment will be described with reference to FIGS. 17 to 19. In the seat slide device 100 of the fifth embodiment, the passage-detection sensors SE1 and SE2, the first solenoid SOL1, the second solenoid SOL2, the stopper ECU 150 and the cancelling switch SW in the configuration of the second embodiment are omitted. Instead, engaging holes 112b as stoppers are respectively formed in the rear end of a first range P1 and the front end of a second range P2 in both side wall portions 112 of a lower rail 17B as shown in FIG. 18. FIG. 18 shows the lower rail 17B in the rear end of the first range P1. Engaging pins 115, which function as engaging members, are engaged in the pair of front and rear engaging holes 112b in a width direction of the lower rail 17B such that the engaging pins 115 can move along the width direction of the lower rail 17B.

Figure 19A:
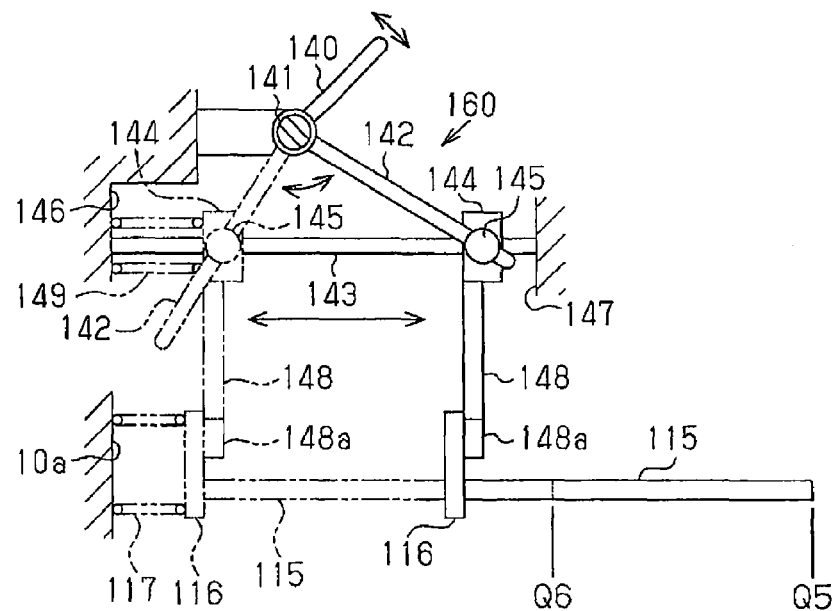
FIG. 19(a) is a schematic diagram of a stopper portion in the seat slide device of the fifth embodiment

As shown in FIG. 19(a), one end of each engaging pin 115 projects outside of the lower rail 17B, and a flange 116 is formed on the end of the engaging pin 115. Springs 117 as urging members are attached to the flanges 116. One end of each of the springs 117 abuts against and is supported by a support portion 10a provided on a vehicle floor 10, and the other end of the spring 117 always urges the flange 116 toward the lower rail 17B.

A projection (not shown) is formed on a periphery of each of the engaging pins 115 in the vicinity of the flange 116. When the projection engages with one of the side wall portions 112, which is close to the flange 116, an inner end of the engaging pin 115 is fitted into the engaging hole 112b. The position at this time is a position where the engaging pin 115 abuts against an upper rail 20, and this position is referred to as a stop position Q5. The engaging pin 115 can move from the stop position Q5 to a retraction position Q6, where the inner end of the engaging pin 115 approaches the engaging hole 112b, which is close to the flange 116. When the engaging pin 115 is arranged at the retraction position Q6, movement of the upper rail 20 is allowed.

A stopper-releasing operation lever 140, which functions as a stopper-releasing operating portion, is pivotally supported by a lower portion of a front passenger seat 18 through a rotation shaft 141. A lever member 142 is fixed to the rotation shaft 141, which is pivoted together with the stopper-releasing operation lever 140. A support shaft 143 extends between support portions 146 and 147 below the lever member 142 and at a lower portion of the front passenger seat 18. The support portions 146 and 147 are provided on a frame of the front passenger seat 18. The support shaft 143 extends horizontally or substantially horizontally in the width direction of the lower rail 17B. Sliders 144 are supported by the support shaft 143 such that the sliders 144 can slide in the extending direction of the support shaft 143. A spring 149 is located around the support shaft 143 and between the sliders 144 and the support portion 146, which is separated from the lower rail 17B. The slider 144 is always urged by the spring 149 toward the support portion 147, which is close to the lower rail 17B.

Rotating bodies 145 are rotationally connected to the sliders 144 through a shaft (not shown) intersecting with the extending direction of the support shaft 143 at right angles. The lever members 142 respectively penetrate the rotating bodies 145 and the lever members 142 are inserted into the rotating bodies 145 such that the lever members 142 can slide with respect to the rotating bodies 145. Cooperation members 148 extending downward from the slider 144 are formed on the sliders 144.

Figure 19B:
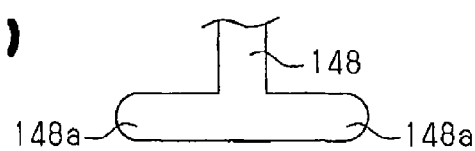
FIG. 19(b) is a schematic diagram of essential portions of a cooperation member.

As shown in FIG. 19(b), a pair of engaging portions 148a and 148a extending in the front-rear direction is formed on lower portions of the cooperation members 148.

As shown in FIG. 18, each of the cooperation members 148 is located between the flange 116 of the engaging pin 115 arranged at the stop position and the side wall portion 112 of the lower rail 17B when the front passenger seat 18 is arranged at the rear end of the first range P1 and when the front passenger seat 18 is arranged at the front end of the second range P2.

A transmitting mechanism 160, which transmits operation force of the stopper-releasing operation lever 140, is composed of the rotation shaft 141, the lever member 142, the slider 144, the rotating body 145, the cooperation member 148 and the spring 149.

Operation of Fifth Embodiment

Operation of the seat slide device 100 of the fifth embodiment will be described. In the fifth embodiment, when the restriction is not cancelled by the stopper-releasing operation lever 140, the pair of engaging pins 115 is arranged at the stop position Q5 by the springs 117.

Figure 17:
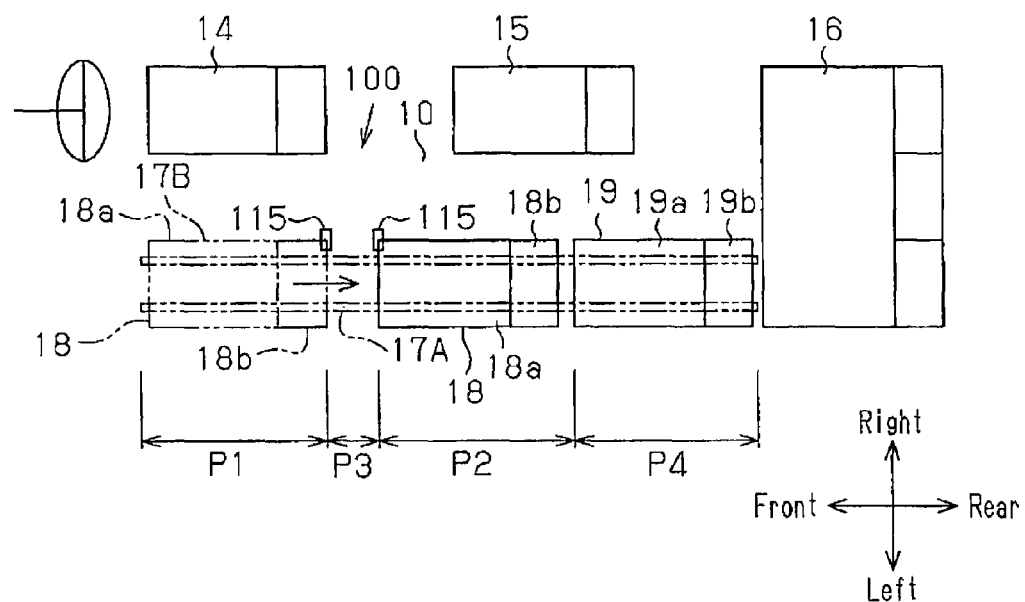
FIG. 17 is a schematic plan view of a vehicle having a seat slide device of a fifth embodiment.
Figure 18:
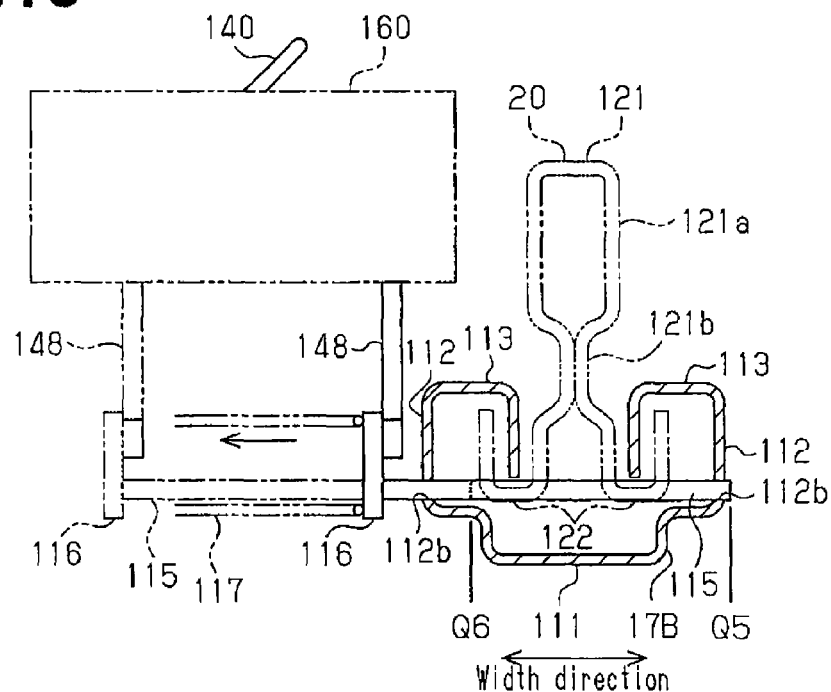
FIG. 18 is a cross-sectional view of a lower rail and an upper rail in the seat slide device of the fifth embodiment.

As shown in FIG. 17, if an occupant sitting on the front passenger seat 18 moves the front passenger seat 18 from the first range P1 toward the second range P2 and moves the front passenger seat 18 to the rear end of the first range P1, the upper rail 20 abuts against the engaging pin 115 arranged at the stop position Q5. According to this, the upper rail 20 and thus the front passenger seat 18 are prevented from moving, and the upper rail 20 stops. The stopping of the upper rail 20 in this manner allows the occupant to confirm his or her intention to move to the second range P2.

In this state, each of the cooperation members 148 is located between the flange 116 and the side wall portion 112 of the lower rail 17B as shown in FIG. 18.

If the occupant desires to move to the second range P2, the stopper-releasing operation lever 140 is operated to be rotated clockwise as viewed in FIG. 19(a). According to this operation, the lever member 142 and the slider 144 are moved against urging force of the spring 149, and the cooperation member 148 moves the flange 116 to separate from the side wall portion 112 against urging force of the spring 117. According to this, the engaging pin 115 is moved from the stop position Q5 to the retraction position Q6. If the engaging pin 115 moves to the retraction position Q6, the movement of the upper rail 20 is allowed.

If the state where the stopper-releasing operation lever 140 is pivoted in the releasing direction (clockwise as viewed in FIG. 19(a)) is held and the upper rail 20 is moved, the cooperation member 148 attached to the lower portion of the front passenger seat 18 moves together with the upper rail 20, the cooperation member 148 separates from the flanges 116 of the engaging pin 115 and the engaged relation is cancelled. Then, the engaging pin 115 is again moved to the stop position Q5 by the urging force of the spring 117.

Then, after the upper rail 20 passes through the third range P3, the upper rail 20 abuts against the engaging pin 115, which is provided at the front end of the second range P2 and is arranged at the stop position Q5. In this case also, each of the cooperation members 148 is arranged between the flange 116 of the engaging pin 115 provided at the front end of the second range P2 and the side wall portion 112 of the lower rail 17B.

Here, if the occupant operates to cancel the restriction by the stopper-releasing operation lever 140, the engaging pin 115 provided at the front end of the second range P2 is moved to the retraction position Q6, and the restriction of movement of the upper rail 20 can be cancelled, and the upper rail 20 can be moved to the second range P2.

Since a returning operation of each of the engaging pins 115 provided at the front end of the second range P2 from the retraction position Q6 to the stop position Q5 is the same as the operation of the engaging pin 115 of the first range P1, description of the returning operation will be omitted.

When the upper rail 20 is moved from the second range P2 to the first range P1, if the upper rail 20 abuts against engaging pin 115 arranged at the stop position Q5, the stopper-releasing operation lever 140 should be operated as described above.

Therefore, the upper rail 20 and thus the front passenger seat 18 are prevented from moving by the engaging pin 115, the upper rail 20 stops, and the occupant can confirm his or her intention to move outside from the second range P2.

According to the fifth embodiment, the following advantages are achieved.

(1) In the seat slide device 100 of the fifth embodiment, the stopper portion includes the engaging holes 112b (stoppers), the engaging pins 115 (engaging members), and the springs 117 (urging members). The engaging holes 112b (stoppers) are provided on both the side wall portions of the lower rail in the rear end of the first range P1 (front range) and the front end of the second range P2 (rear range) of the lower rail 17B. The engaging pins 115 (engaging members) restrict the movement of the upper rail 20 in a state where the engaging pins 115 are provided on the lower rail 17B such that they can engage with the pair of engaging holes 112b (stoppers) and the engaging pins 115 are engaged with the engaging holes 112b. The springs 117 (urging members) urge the engaging pins 115 in the direction in which the engaging pins 115 are engaged with the engaging holes 112b. The stopper-releasing operating portion includes the stopper-releasing lever, which is provided on the front passenger seat 18 (movable seat), and disengages the engaging pin 115 (engaging member) from the engaging hole 112b (stopper) against the urging force of the spring 117 (urging member). As a result, according to the fifth embodiment, it is possible to prevent the front passenger seat 18 (movable seat) from moving from the first range P1 to the second range P2 and from the second range P2 to the first range P1. Therefore, it is possible to prevent the front passenger seat 18 (movable seat) from unintentionally moving between the first range P1 and the second range P2.

(2) In the fifth embodiment, the engaging pins 115 are provided on rear end of the first range P1 and the front end of the second range P2, and the engaging pins 115 can stop the movement of the upper rail 20. Therefore, whenever the upper rail 20 tries to move to another range on the lower rail 17B, the occupant can confirm his or her intention to move.

The embodiments may be modified as follows.

In each of the embodiments, in the vehicle having three seat rows, the front passenger seat in the first seat row is the front seat, and the seat in the second seat row that is behind the front passenger seat is the rear seat, but the invention is not limited to this. For example, in the vehicle having three seat rows, one of seats in the second seat row may be a front seat, and a seat in the third seat row that is behind this seat may be a rear seat.

Although the first interval L1 between the lock holes 114a and the second interval L2 between the stopper holes 114b and 114c are different from each other in the first embodiment, the first interval and the second interval may be equal to each other. In this case, the lock holes 114a and the stopper holes 114b and 114c may be formed into different shapes so that the stopper pawls 128a can be inserted into the stopper holes 114b and 114c but cannot be inserted into the lock holes 114a.

Although the stopper is the stopper hole (i.e., through hole which is penetrated in thickness direction of folded wall portion 114) in the first embodiment, the stopper is not limited to a hole, and the stopper may be a recess that is dented upward from a lower surface of the folded wall portion 114 or may be of another shape such as a groove.

In the first embodiment, both the stopper holes 114b and 114c (stoppers) provided in the first range P1 and the second range P2 may be omitted, and the lower rail in the third range P3 may be provided with stopper holes 114d as stoppers described in the first embodiment as shown in FIG. 1. In this case, other configurations should be the same as those of the first embodiment.

In the second embodiment, the first solenoid SOL1, the second solenoid SOL2, the passage-detection sensor SE1 and the passage-detection sensor SE2 provided in the first range P1 and the second range P2 may be omitted, and the lower rails in the third range P3 may be provided with the stopper holes 114d as stoppers described in the first embodiment as shown in FIG. 1. In this case, other configurations should be the same as those of the first embodiment.

Figure 20:
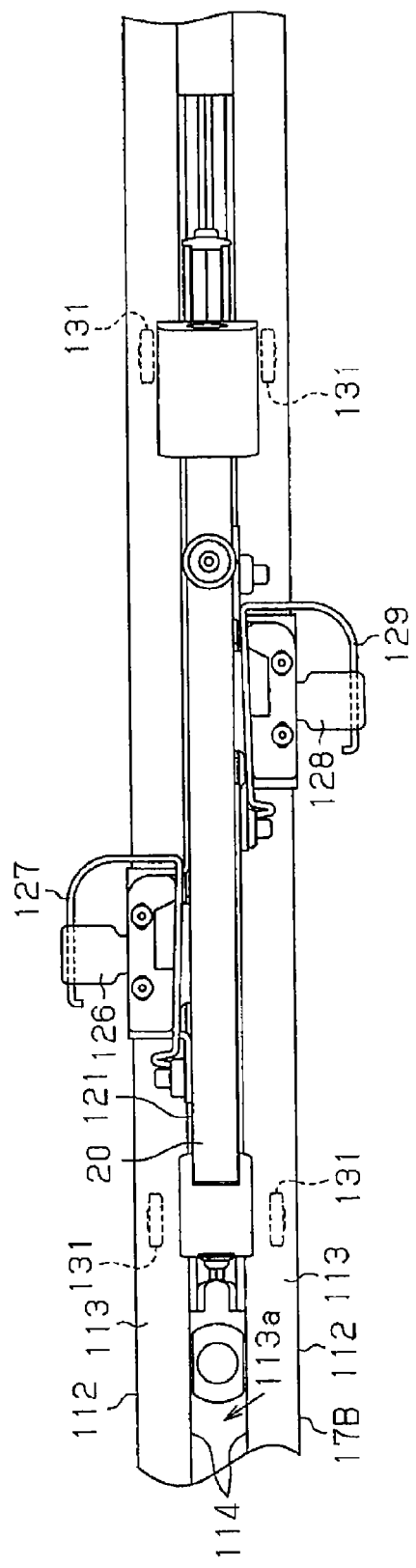
FIG. 20 is a plan view showing a state where an upper rail is incorporated in a lower rail in a modification of the first embodiment and corresponds to FIG. 4(a)

In the first embodiment, the lock lever 126 and the stopper lever 128 are provided on one side of the upper rail 20 in the vehicle width direction as shown in FIG. 4. In place of this configuration, the lock lever 126 and the stopper lever 128 may respectively be provided on both sides of the upper rail 20 in the vehicle width direction as shown in FIG. 20. FIGS. 21(a) and 21(b) are cross-sectional views of the upper rail 20 and the lower rails 17B when the stopper lever 128 is provided on an opposite side from the upper rail 20 in the vehicle width direction. As shown in FIGS. 21(a) and 21(b), the insertion hole 123b for the stopper lever 128 can be provided in one of the folded wall portions 123 that is different from the other folded wall portion 123, in which the insertion hole 123a is formed.

If the lock lever 126 and the stopper lever 128 are respectively provided on both sides of the upper rail 20 in the vehicle width direction in this manner, the lock holes 114a for the lock lever 126 can be arranged on one of the side wall portions of the lower rail 17B at equal intervals from one another. That is, since the lock holes 114a and the stopper holes 114b are provided in the different folded wall portions 114 of the lower rail 17B, it is unnecessary to take the interference between the lock holes 114a and the stopper holes 114b into consideration. Hence, it is also possible to provide the lock holes 114a at equal intervals from one another in the third range P3 of the lower rail 17B, or from the front end to the rear end of the 117b, or the entire range from the first range P1 to the second range P2 of the lower rail 17B. In the first embodiment, since the insertion holes 123a and the insertion holes 123b are provided in the same folded wall portion 123, it is necessary to provide these holes so that they do not interfere with each other.

Although the passage-detection sensors SE1 and SE2 are provided as the detector in the second embodiment, the passage-detection sensors SE1 and SE2 may be omitted.

In this case, when the cancelling switch SW is held in the ON state, the stopper ECU 150 operates in accordance with the prevention-cancelling mode, and when the cancelling switch SW is switched from the ON state to the OFF state, the stopper ECU 150 operates in accordance with the prevention mode. In this case, to move between the first range P1 and the second range P2, the cancelling switch SW should be held in the ON state while the upper rail 20 moves in the third range P3.

Although the first and second embodiments have the third range P3, the third range P3 may be omitted and the first range P1 and the second range P2 may be directly connected to each other.

If the third range P3 is omitted in the second embodiment and a modification of the second embodiment, one actuator such as a solenoid and a passage-detection sensor should be provided at the boundary between the first range P1 and the second range P2 or in the vicinity of the boundary.

In this modification, when the detector is provided, after the cancelling switch SW is switched to the ON state and until the one detector (passage-detection sensor) detects that the upper rail 20 passes, the stopper ECU 150 should operate in accordance with the prevention-cancelling mode, and after the passage is detected, the stopper ECU 150 should operate in accordance with the prevention mode as in the second embodiment.

When the detector is not provided, the stopper ECU 150 should operate in accordance with the prevention-cancelling mode while the cancelling switch SW is held in the ON state, and if the ON state of the cancelling switch SW is cancelled, the stopper ECU 150 should operate in accordance with the prevention mode. In this case, if an occupant carries out the ON/OFF operation of the cancelling switch SW, the upper rail 20 can move between the first range P1 and the second range P2 without interfering.

In the second embodiment, the modification of the second embodiment or the fourth embodiment, the plungers SOLa of the first and second solenoids SOL1 and SOL2, or the plunger SOLa of the solenoid SOL can interfere with the front end or the rear end of the upper rail 20 at the stop position, but a target against which the plunger SOLa abuts is not limited to the upper rail 20. The plunger SOLa arranged at the stop position may contact with another member (non-upper rail member) other than the upper rail 20 provided on the seat cushion 18a, i.e., against a portion of the front passenger seat 18, thereby stopping the front passenger seat 18.

In the second to fifth embodiments or the above modifications, the actuator is composed of the solenoid, but the invention is not limited to this. For example, a motor may be used as the actuator, and a lock pin that is straightly reciprocated by a pinion driven by the motor and a rack meshing with the pinion may be used as the operating member. It is preferable that the lock pin straightly reciprocates. A cylinder such as an air pressure or liquid pressure cylinder may be used as the actuator, and a rod of the cylinder may be used as the operating member.

In the fifth embodiment, the engaging pins 115 and the engaging holes 112b are provided on and in the rear end of the first range P1 and the front end of the second range P2, but the engaging pins 115 and the engaging holes 112b may be provided at one of the rear end of the first range P1 and the front end of the second range P2. The engaging pins 115 and the engaging holes 112b may be provided in the third range P3.

DESCRIPTION OF THE REFERENCE NUMERALS

First range P1 (front range), second range P2 (rear range), third range P3 (non-lock range), Q1 . . . stop position, Q2 . . . retraction position,
SW . . . cancelling switch (stopper-releasing operating portion),
SOL1 . . . first solenoid (actuator),
SOL2 . . . second solenoid (actuator)
SOL . . . solenoid (actuator),
SE1 . . . passage-detection sensor (detector),
SE2 . . . passage-detection sensor (detector),
10 . . . vehicle floor, 17A, 17B . . . lower rails,
18 . . . front passenger seat (movable seat),
20 . . . upper rails, 32 . . . airbag,
100 . . . seat slide device,
114b, 114c . . . stopper holes (stopper),
126 . . . lock lever (lock portion),
127 . . . torsion spring (urging member),
128 . . . stopper lever (engaging member),
130 . . . stopper-releasing lever (stopper-releasing operating portion),
150 . . . stopper ECU (controller).

The invention claimed is:

1. A seat slide device comprising:
a lower rail, which is configured to be fixed to a floor of a vehicle, includes a front range and a rear range, and extends in a front-rear direction;
an upper rail, which is configured to support a movable seat and is movable on the lower rail;
a lock portion, which is provided on the upper rail and selectively restricts movement of the upper rail on the lower rail at a plurality of positions in each of the front range and the rear range;
a stopper portion, which stops movement of the upper rail before the upper rail crosses over any one of the front range and the rear range and enters the other range; and
a stopper-releasing operating portion that allows the upper rail to move when the upper rail has been stopped by the stopper portion,
wherein the stopper portion includes:
stoppers respectively provided at a rear end of the front range and a front end of the rear range of the lower rail;
an engaging member, which is provided on the upper rail and engages with one of the stoppers to restrict movement of the upper rail; and
an urging member for urging the engaging member in a direction in which the engaging member engages with the stopper,
wherein the engaging member engages with the stopper when the upper rail moves and the engaging member is opposed to the stopper, and
wherein the stopper-releasing operating portion includes a stopper-releasing lever, which is configured to be provided on the movable seat and disengages the engaging member from the stopper against an urging force of the urging member.

2. The seat slide device according to claim 1, wherein the lower rail includes a non-lock range, in which the lock portion cannot restrict movement of the upper rail, wherein the non-lock range is located between the front range and the rear range.

3. The seat slide device according to claim 2, wherein a detector for detecting the upper rail, which moves in the non-lock range, wherein
the stopper portion includes:
a pair of actuators respectively provided at a rear end of the front range and a front end of the rear range of the lower rail such that the actuators are opposed to each other, wherein each of the actuators includes an operating member capable of reciprocating between a stop position and a retraction position, and the operating member can contact with the upper rail at the stop position and cannot contact with the upper rail at the retraction position, and
a controller, which can operate in any of a prevention mode and a prevention-cancelling mode in a switching manner, wherein the controller controls, in the prevention mode, the actuators such that the operating members of the actuators are arranged at the stop position, and the controller controls, in the prevention-cancelling mode, the actuators such that the operating members of the actuators are arranged at the retraction position, and
after the stopper-releasing operating portion is operated and until the detector completes detection of the upper rail, which moves in the non-lock range, the controller operates in accordance with the prevention-cancelling mode, and when the stopper-releasing operating portion is not operated, the controller operates in accordance with the prevention mode.

4. The seat slide device according to claim 2, wherein the stopper portion includes:
a single actuator opposed to a portion of the non-lock range of the lower rail, wherein the actuator includes an operating member capable of reciprocating between a stop position and a retraction position, and the operating member can contact with the upper rail at the stop position and cannot contact with the upper rail at the retraction position; and
a controller, which can operate in any of a prevention mode and a prevention-cancelling mode in a switching manner, wherein the controller controls, in the prevention mode, the actuator such that the operating member of the actuator is arranged at the stop position, and the controller controls, in the prevention-cancelling mode, the actuator such that the operating member of the actuator is arranged at the retraction position,
wherein, when the stopper-releasing operating portion is not operated, the controller operates in accordance with the prevention mode, and when the stopper-releasing operating portion is operated, the controller operates in accordance with the prevention-cancelling mode.

5. The seat slide device according to claim 1, wherein the stopper portion includes:
a pair of actuators respectively provided at a rear end of the front range and a front end of the rear range of the lower rail such that the actuators are opposed to each other, wherein each of the actuators includes an operating member capable of reciprocating between a stop position and a retraction position, and the operating member can contact with the upper rail at the stop position and cannot contact with the upper rail at the retraction position, and
a controller, which can operate in any of a prevention mode and a prevention-cancelling mode in a switching manner, wherein the controller controls, in the prevention mode, the actuators such that the operating members of the actuators are arranged at the stop position, and the controller controls, in the prevention-cancelling mode, the actuators such that the operating members of the actuators are arranged at the retraction position,
wherein, when the stopper-releasing operating portion is operated, the controller operates in accordance with the prevention-cancelling mode, and when the stopper-releasing operating portion is not operated, the controller operates in accordance with the prevention mode.

6. The seat slide device according to claim 1, wherein the stopper portion includes:
a single actuator opposed to a boundary between the front range and the rear range in the lower rail, wherein the actuator includes an operating member capable of reciprocating between a stop position and a retraction position, the operating member can contact with the upper rail at the stop position and cannot contact with the upper rail at the retraction position; and
a controller, which can operate in any of a prevention mode and a prevention-cancelling mode in a switching manner, wherein the controller controls, in the prevention mode, the actuator such that the operating member of the actuator is arranged at the stop position, and the controller controls, in the prevention-cancelling mode, the actuator such that the operating member of the actuator is arranged at the retraction position,
wherein the controller operates in accordance with the prevention-cancelling mode when the stopper-releasing operating portion is operated, and the controller operates in accordance with the prevention mode when the stopper-releasing operating portion is not operated.

7. The seat slide device according to claim 1, wherein a pair of detectors respectively provided at a rear end of the front range and a front end of the rear range of the lower rail, wherein
the stopper portion includes:
an actuator provided on the upper rail, wherein the actuator includes an operating member capable of reciprocating between an engaging position and a disengagement position, and the operating member engages with the lower rail at the engaging position and disengages from the lower rail at the disengagement position; and
a controller capable of operating in any of a prevention mode and a prevention-cancelling mode in a switching manner, wherein the controller controls, in the prevention mode, the actuator such that the operating member of the actuator is arranged at the engaging position to prevent the upper rail from moving, and the controller controls, in the prevention-cancelling mode, the actuator such that the operating member of the actuator is arranged at the disengagement position to allow the upper rail to move, and
when the detector detects that the upper rail is located at any one of the rear end of the front range and the front end of the rear range, the controller operates in accordance with the prevention mode, and when the stopper-releasing operating portion is operated, the controller operates in accordance with the prevention-cancelling mode.

8. The seat slide device according to claim 1, wherein
an airbag device having an airbag is provided in front of the movable seat in the vehicle, and
the front range of the lower rail is included in an airbag protection range in which the airbag of the airbag device expands to protect an occupant, and the rear range of the lower rail is not included in the airbag protection range.

9. A seat slide device comprising:
a lower rail, which is configured to be fixed to a floor of a vehicle, includes a front range and a rear range, and extends in a front-rear direction;
an upper rail, which is configured to support a movable seat and is movable on the lower rail;
a lock portion, which is provided on the upper rail and selectively restricts movement of the upper rail on the lower rail at a plurality of positions in each of the front range and the rear range;
a stopper portion, which stops movement of the upper rail before the upper rail crosses over any one of the front range and the rear range and enters the other range; and
a stopper-releasing operating portion that allows the upper rail to move when the upper rail has been stopped by the stopper portion,
wherein the stopper portion includes:
stoppers respectively provided at a rear end of the front range and a front end of the rear range of the lower rail;
engaging members provided on the lower rail such that the engaging members can engage with the stoppers for restricting movement of the upper rail in a state where the engaging members engage with the stoppers; and
an urging member for urging the engaging members in a direction in which the engaging members engage with the stoppers,
wherein the stopper-releasing operating portion includes a stopper-releasing lever, which is configured to be provided on the movable seat and disengages the engaging members from the stoppers against an urging force of the urging member.

10. The seat slide device according to claim 9, wherein the lower rail includes a non-lock range, in which the lock portion cannot restrict movement of the upper rail, wherein the non-lock range is located between the front range and the rear range.

11. A seat slide device comprising:
a lower rail, which is configured to be fixed to a floor of a vehicle, includes a front range and a rear range, and extends in a front-rear direction;
an upper rail, which is configured to support a movable seat and is movable on the lower rail;
a lock portion, which is provided on the upper rail and selectively restricts movement of the upper rail on the lower rail at a plurality of positions in each of the front range and the rear range;
a stopper portion, which stops movement of the upper rail before the upper rail crosses over any one of the front range and the rear range and enters the other range; and
a stopper-releasing operating portion that allows the upper rail to move when the upper rail has been stopped by the stopper portion,
wherein the lower rail includes a non-lock range, in which the lock portion cannot restrict movement of the upper rail, wherein the non-lock range is located between the front range and the rear range,
wherein the stopper portion includes:
a stopper provided in the non-lock range of the lower rail;
an engaging member provided on the upper rail such that the engaging member can engage with the stopper; and
an urging member, which urges the engaging member in a direction in which the engaging member engages with the stopper when the upper rail moves and the engaging member is opposed to the stopper,
wherein the stopper-releasing operating portion includes a stopper-releasing lever, which is configured to be provided on the movable seat and disengages the engaging member from the stopper against an urging force of the urging member.

* * * * *